Jan. 7, 1936.                  C. W. VOGT ET AL                  2,027,255
       APPARATUS AND METHOD FOR CONTINUOUS SOLIDIFICATION AND
         SUBDIVISION OF ICE CREAM AND ANALOGOUS PRODUCTS
                    Filed July 1, 1933       16 Sheets-Sheet 9
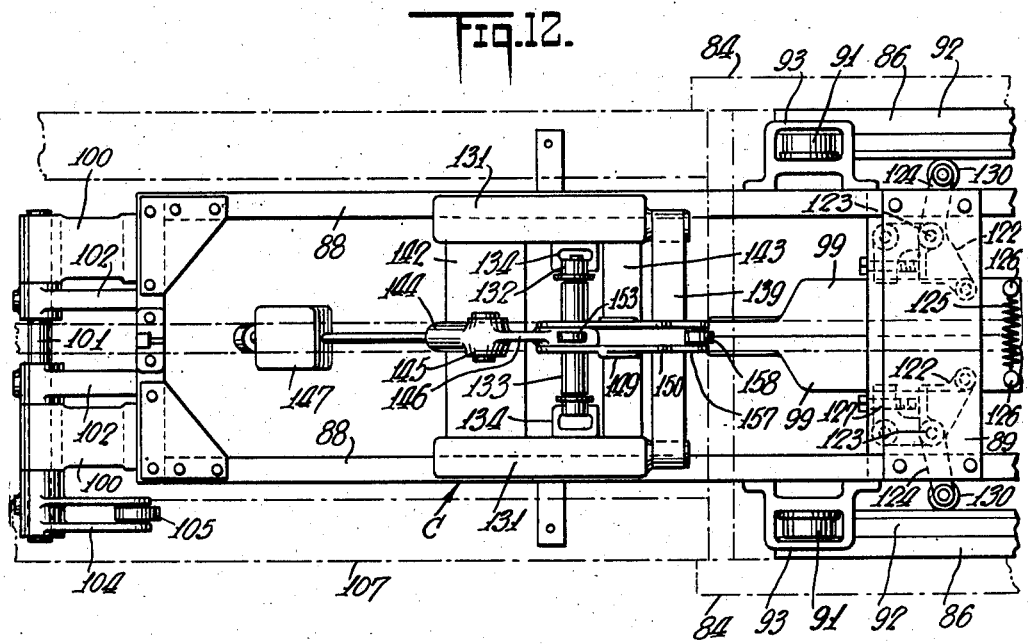
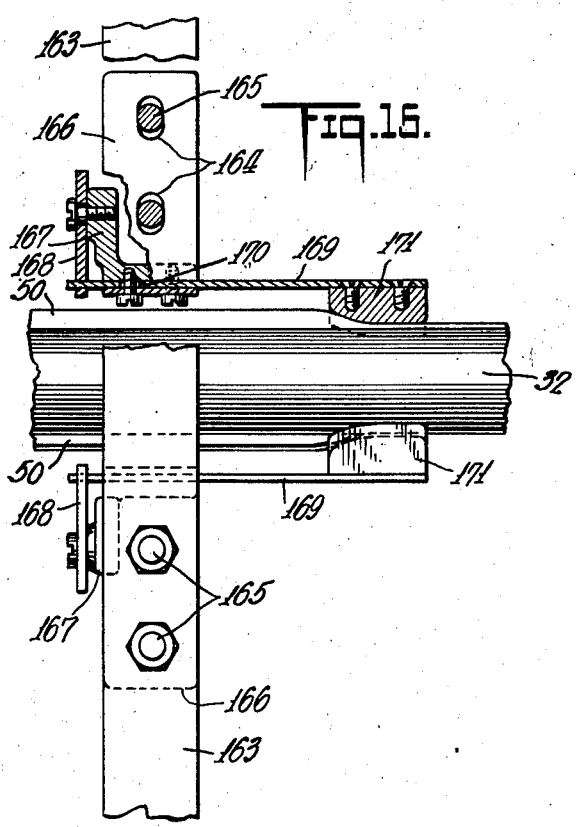
INVENTORS
Clarence W. Vogt
Paul Phelps
BY
ATTORNEYS

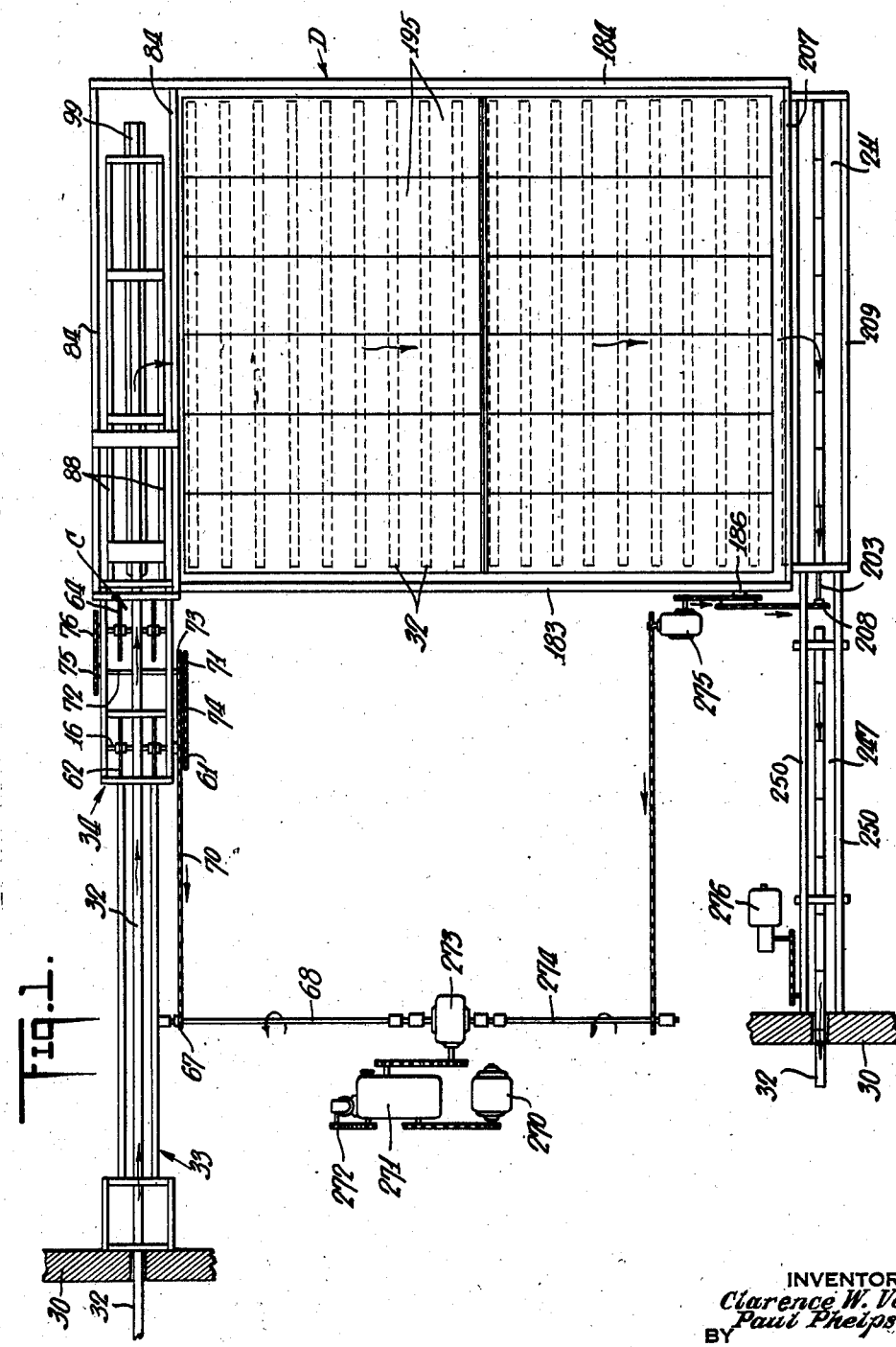

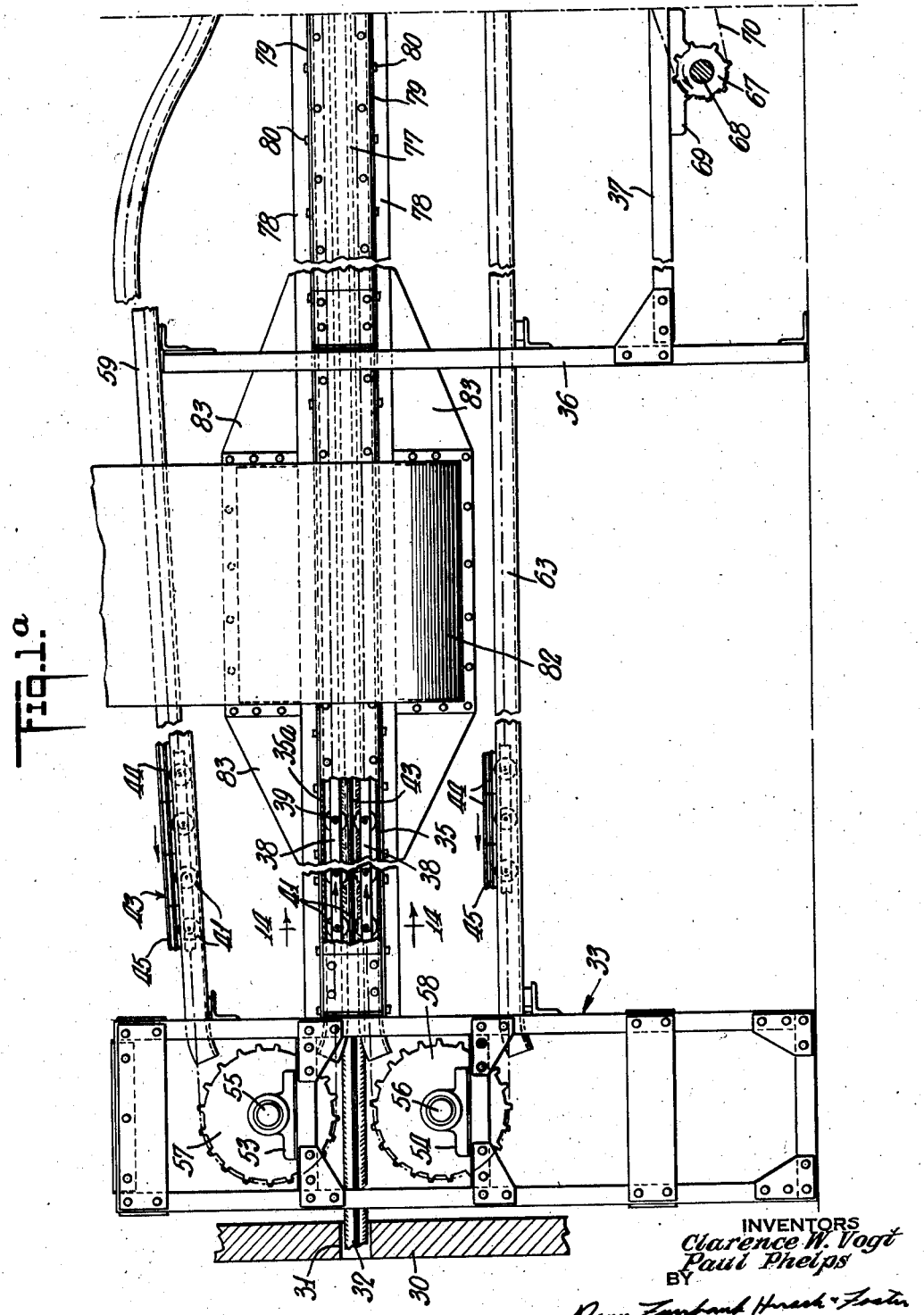

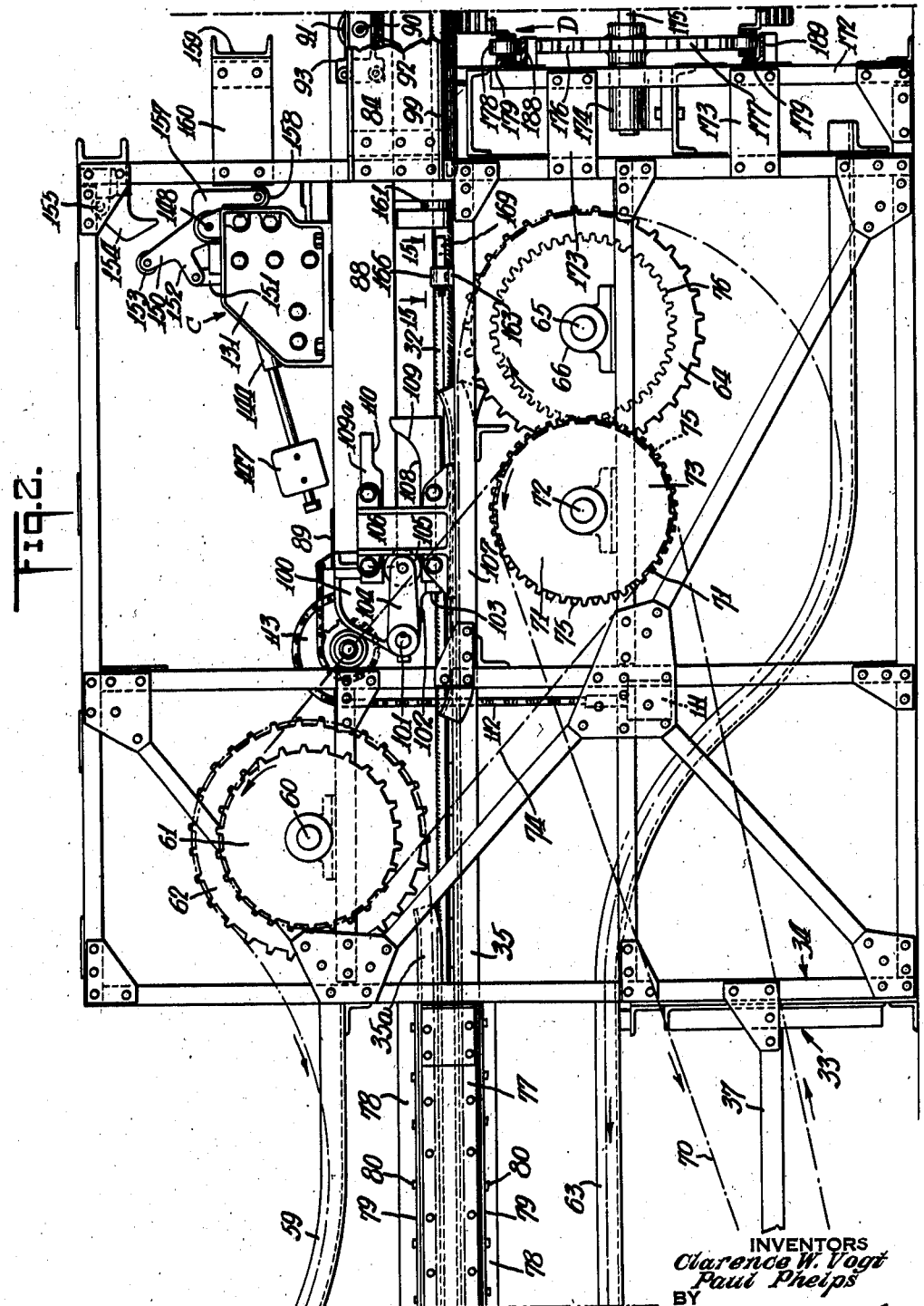

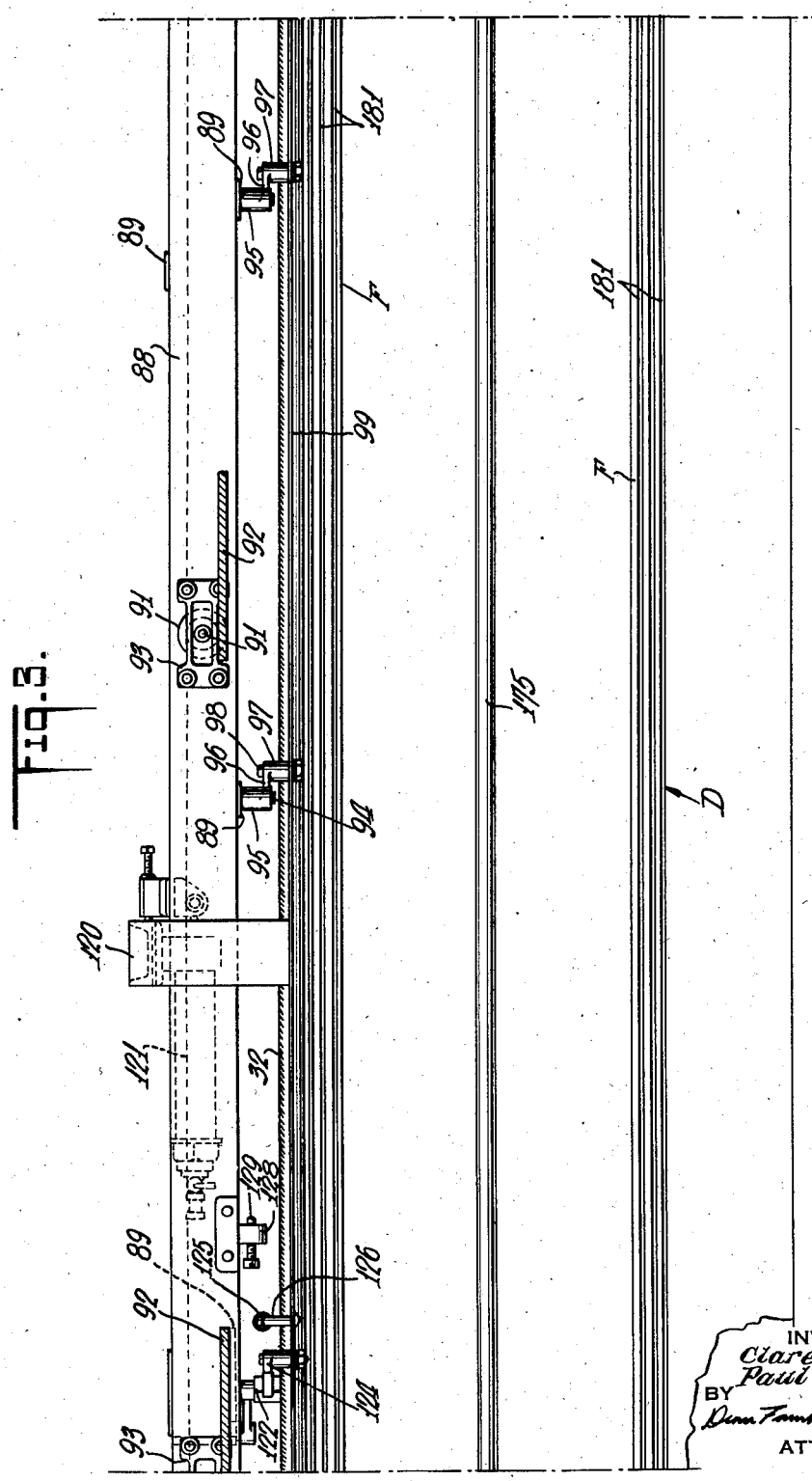

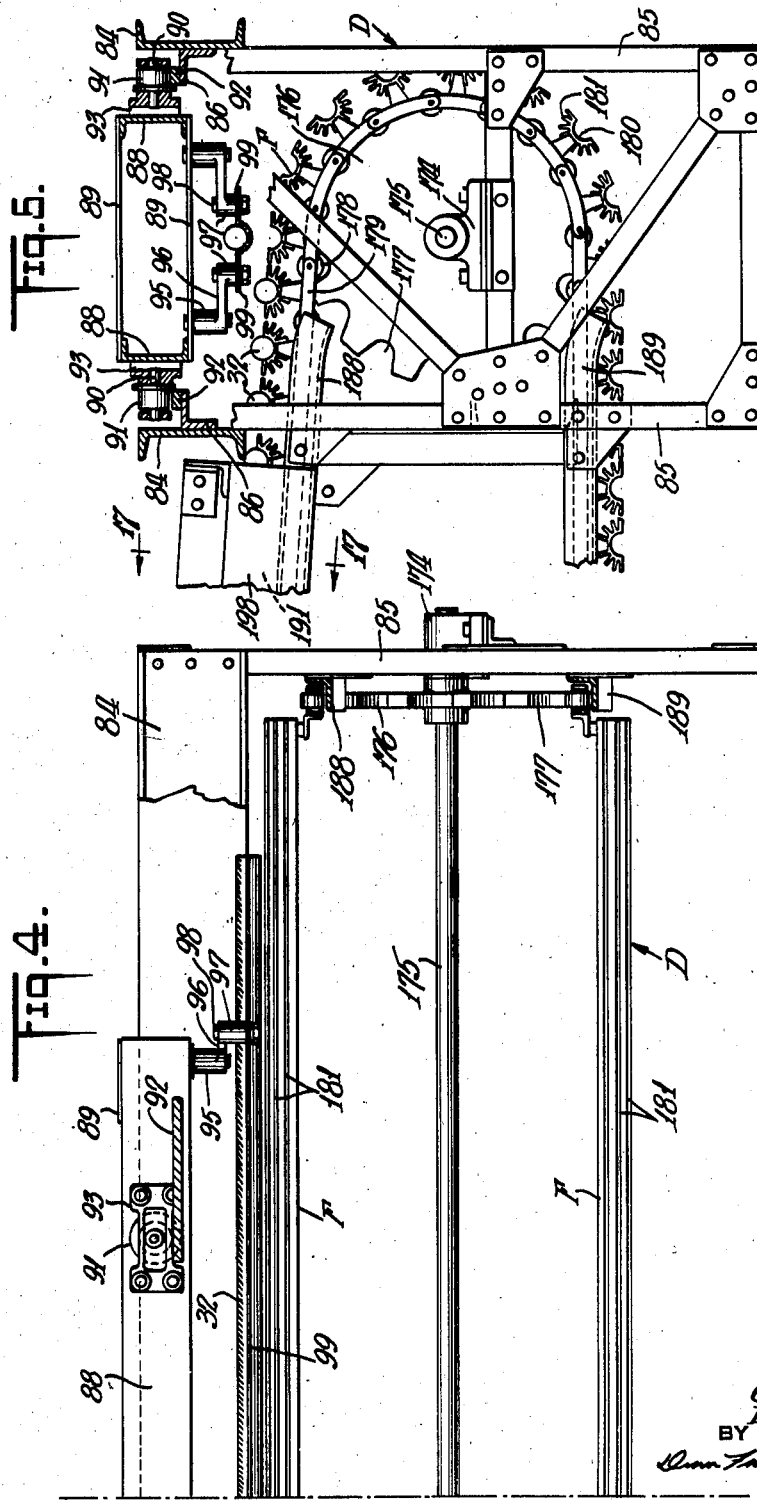

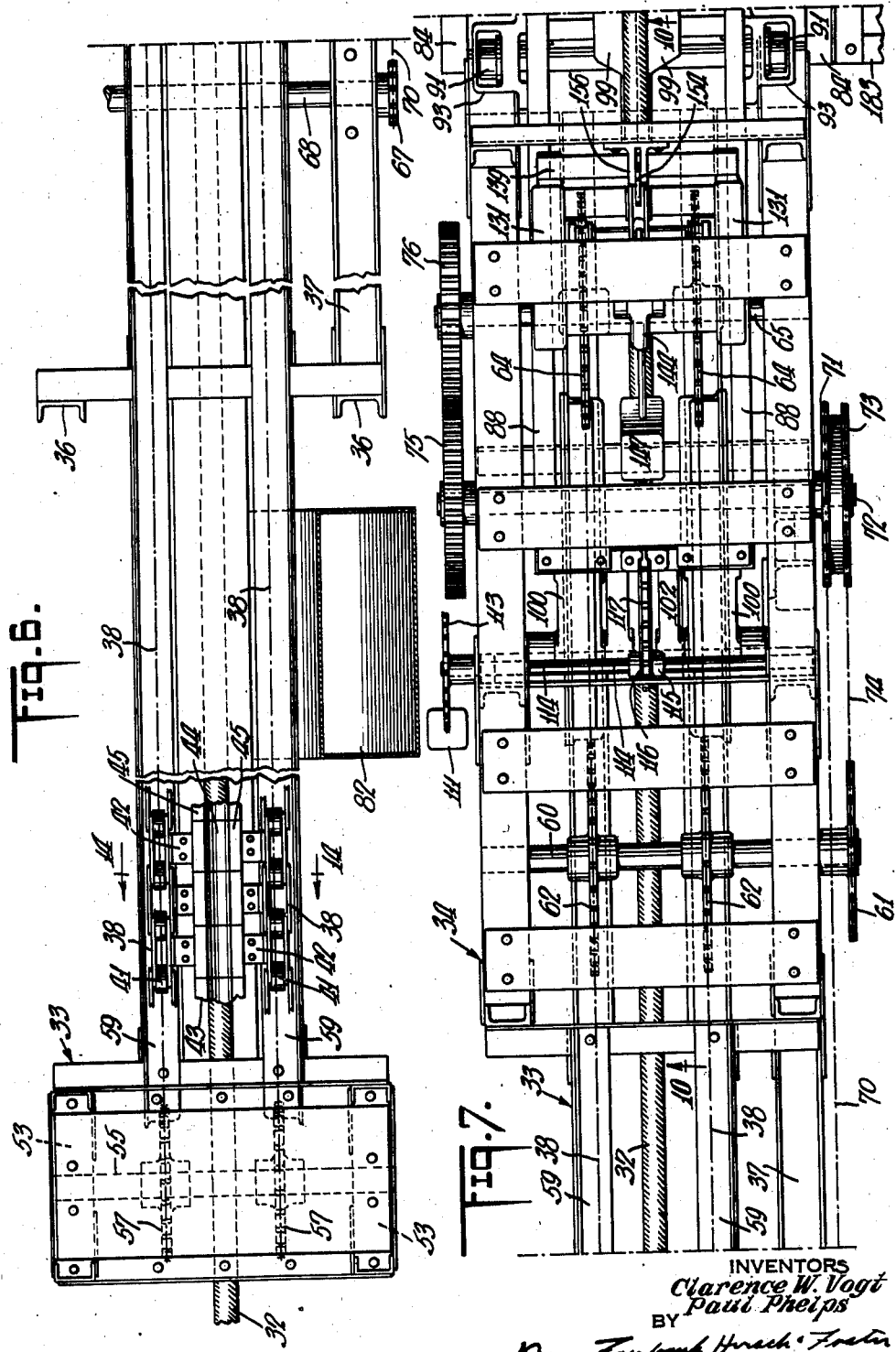

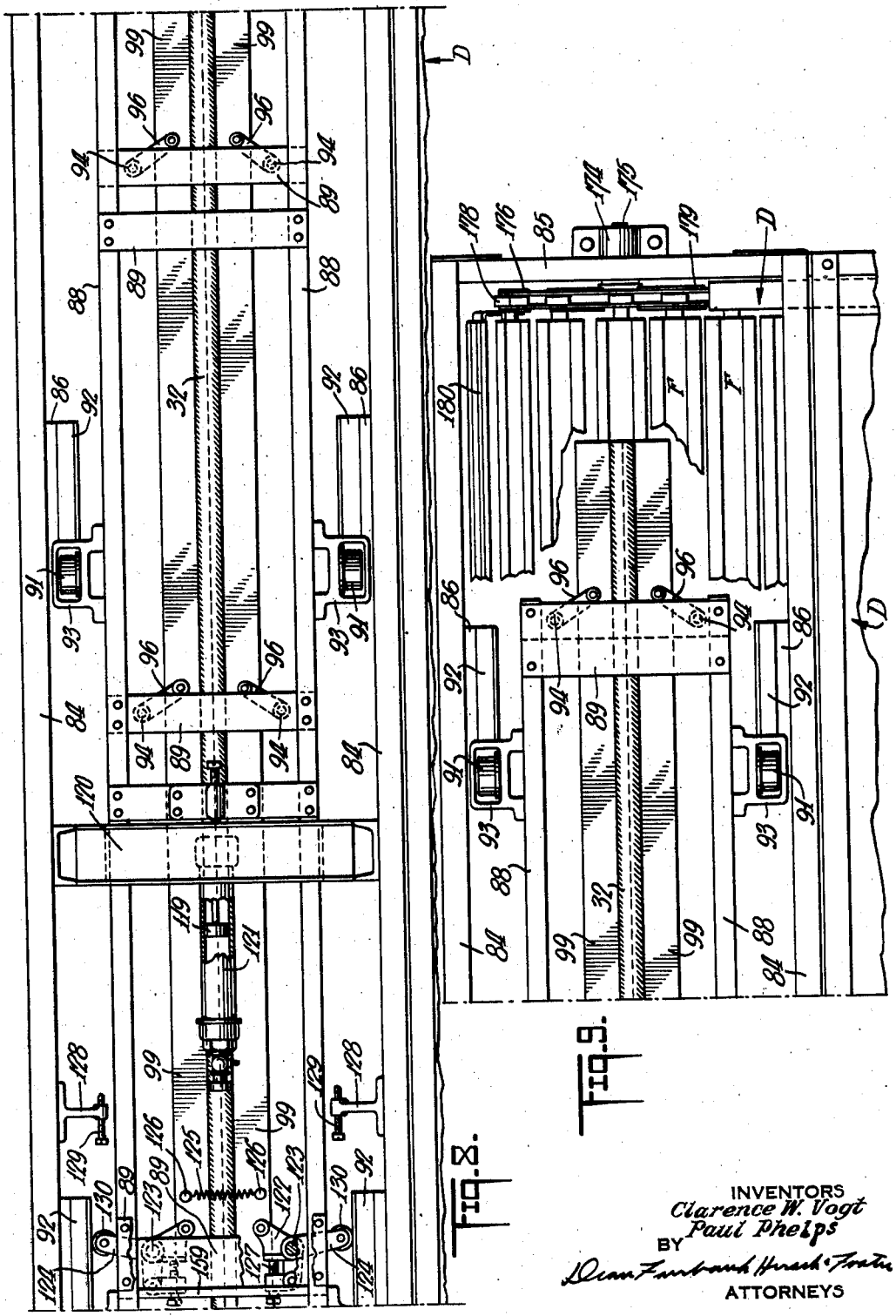

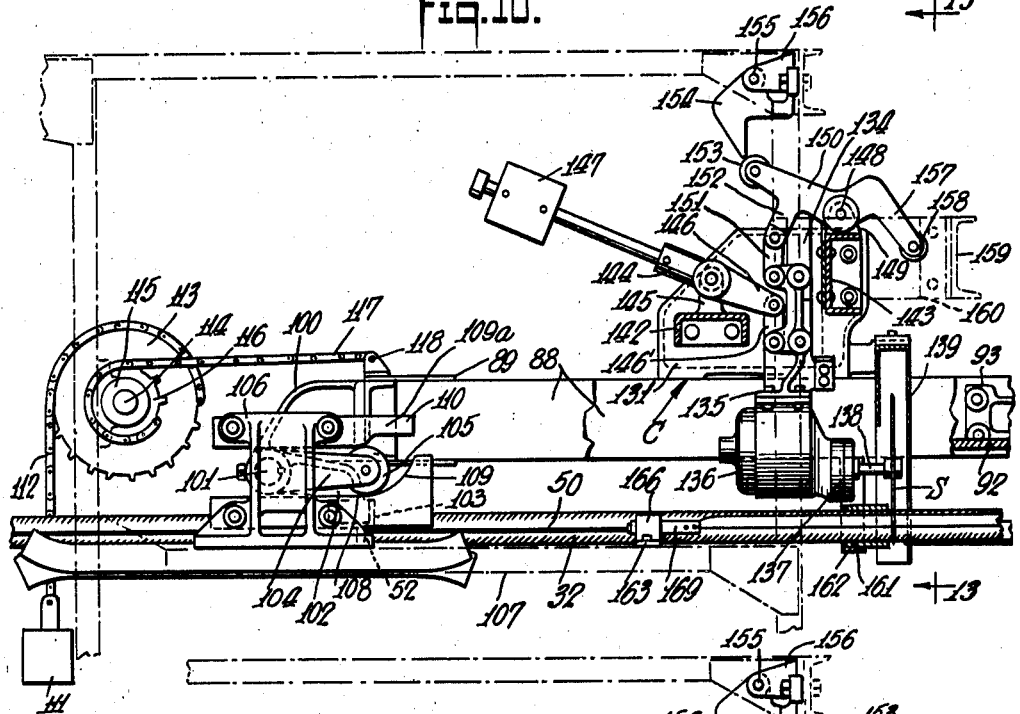

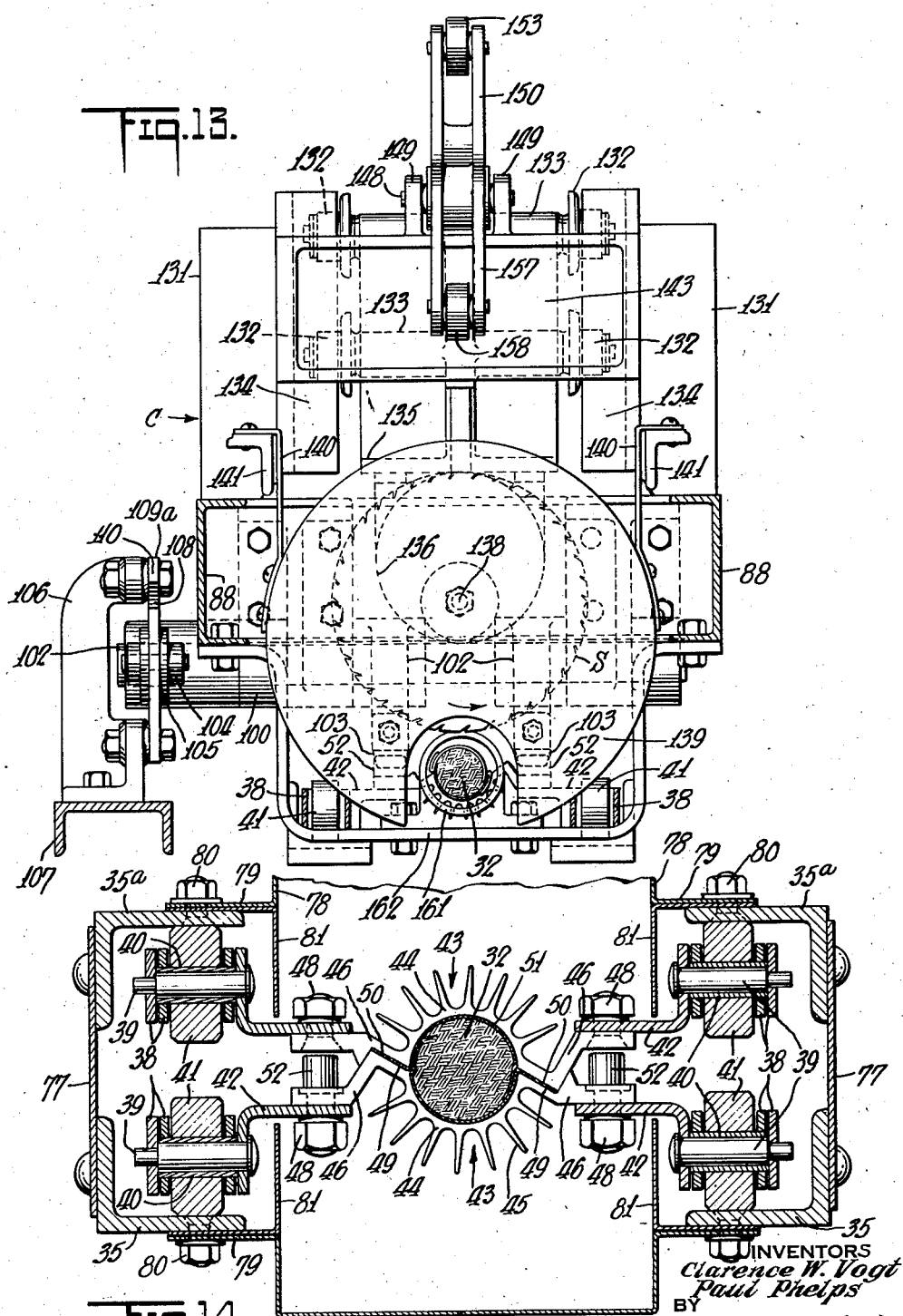

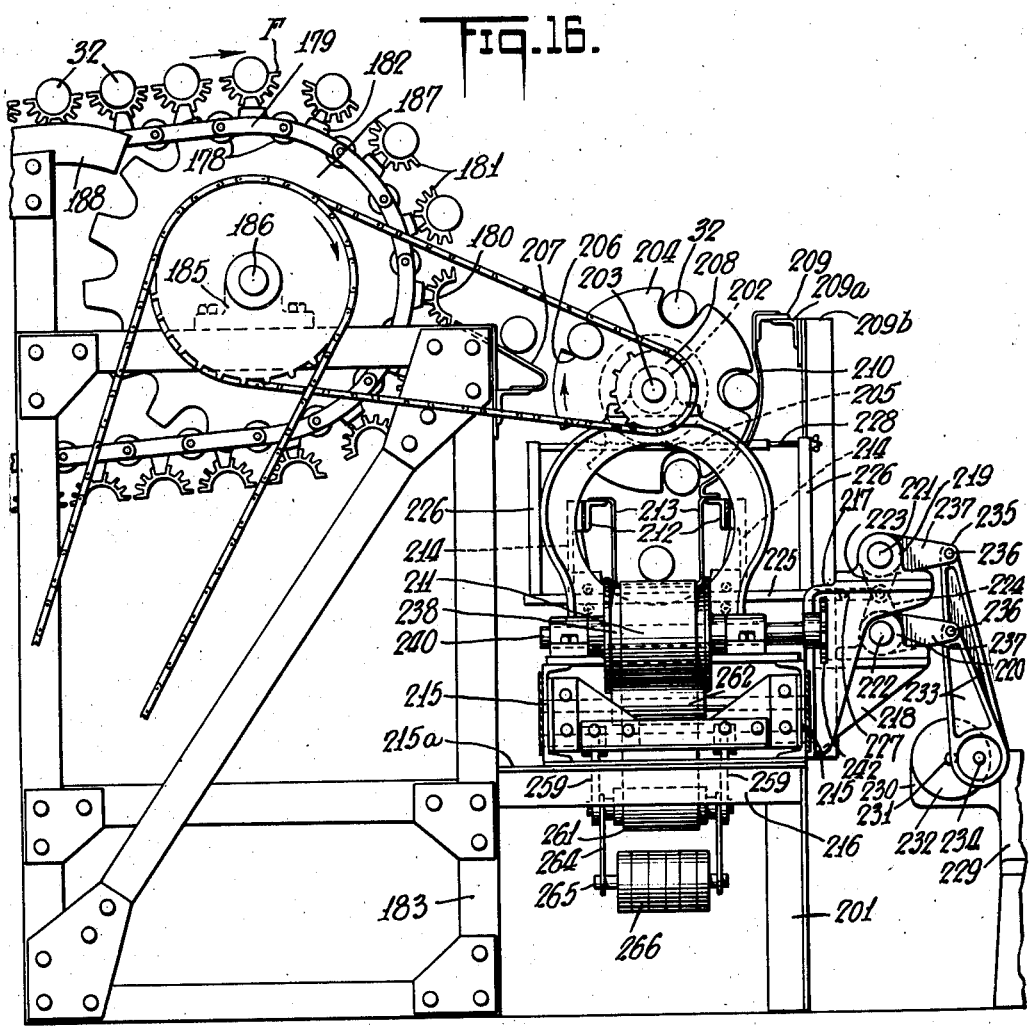
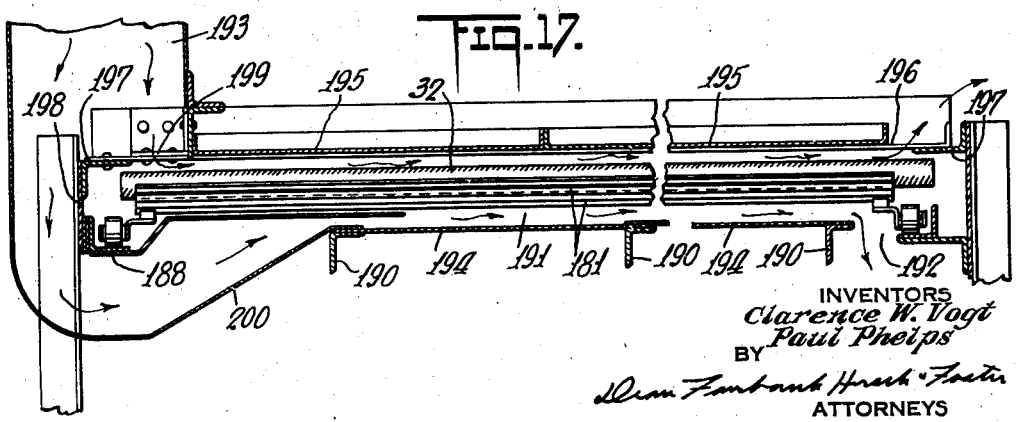

Jan. 7, 1936. C. W. VOGT ET AL 2,027,255
APPARATUS AND METHOD FOR CONTINUOUS SOLIDIFICATION AND
SUBDIVISION OF ICE CREAM AND ANALOGOUS PRODUCTS
Filed July 1, 1933 16 Sheets-Sheet 12
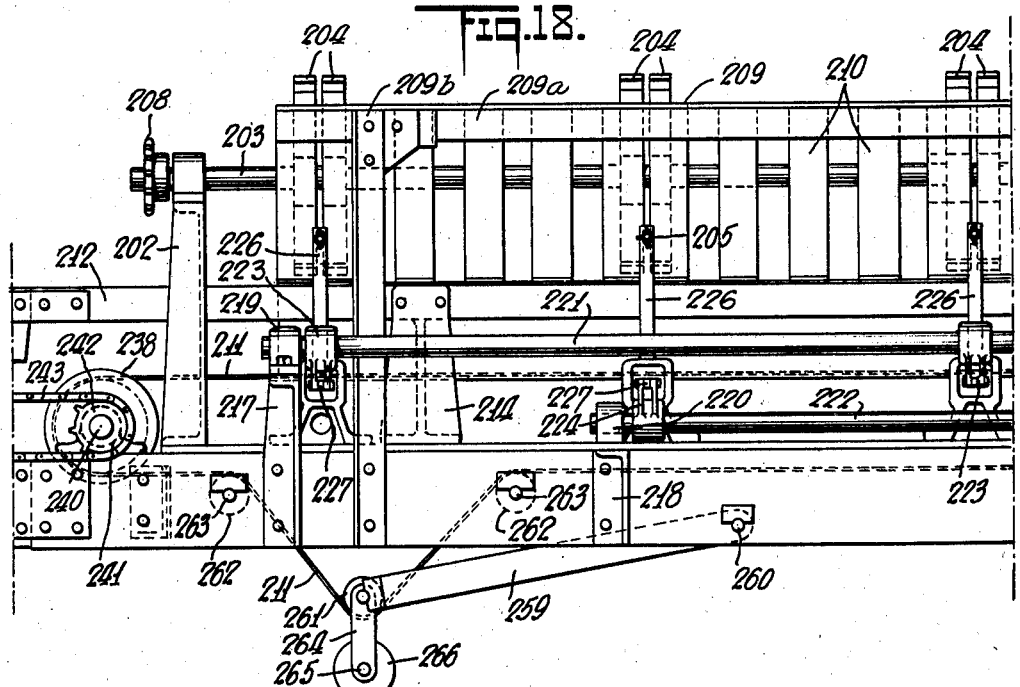
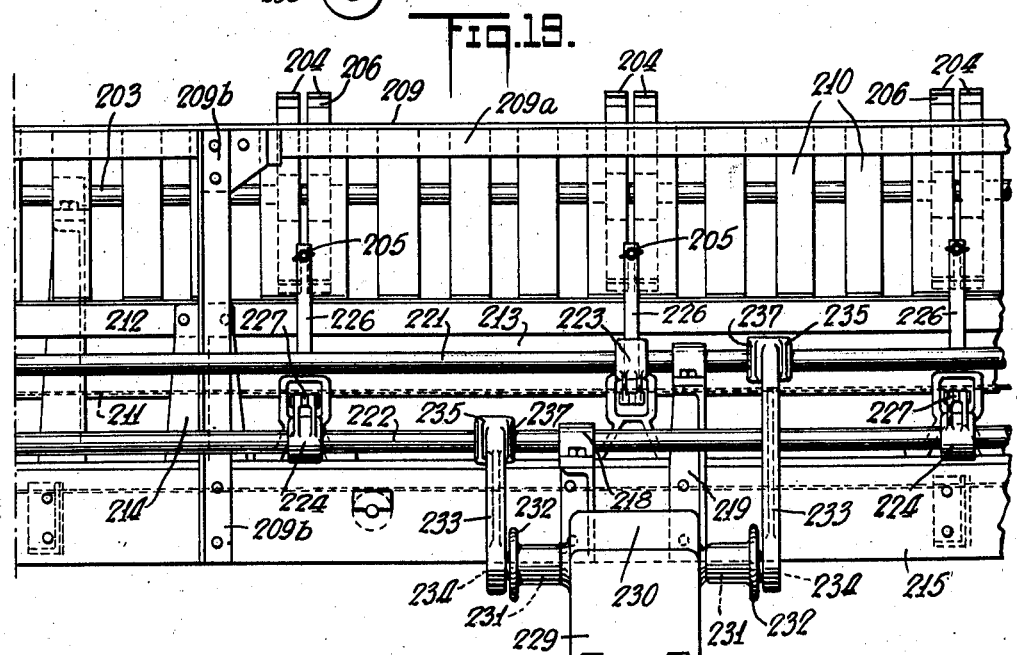
INVENTORS
Clarence W. Vogt
Paul Phelps
BY
ATTORNEYS

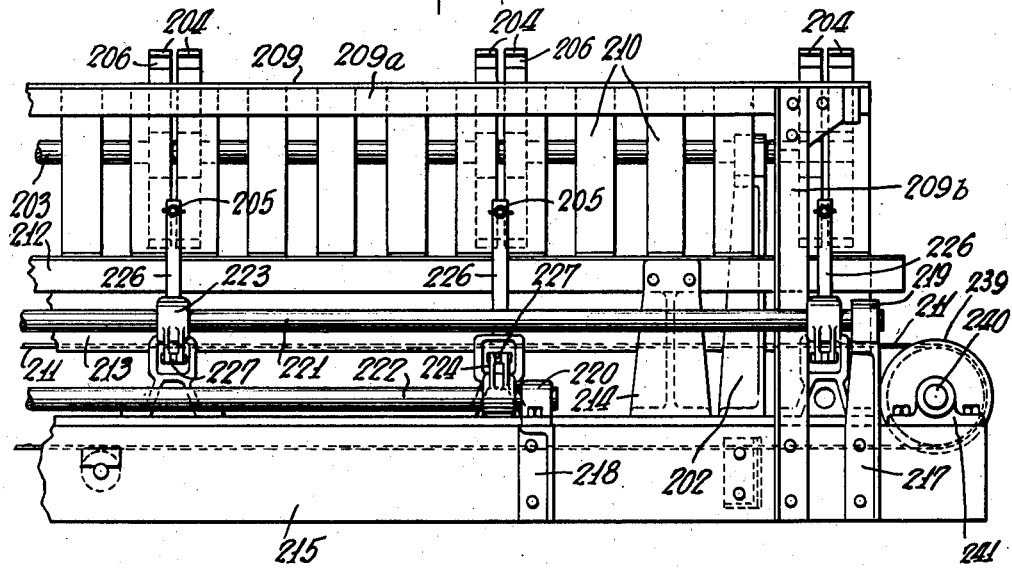
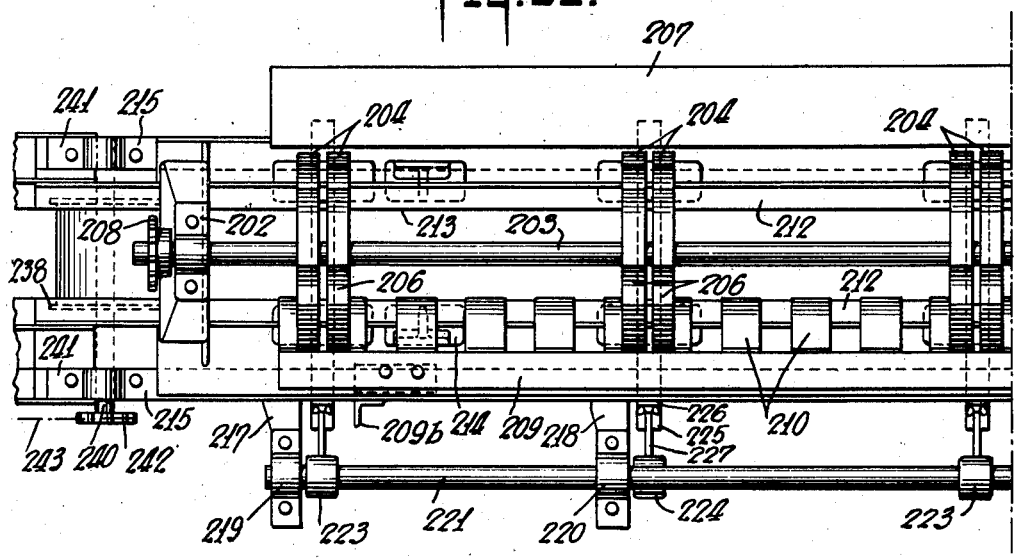

Jan. 7, 1936.      C. W. VOGT ET AL      2,027,255
APPARATUS AND METHOD FOR CONTINUOUS SOLIDIFICATION AND
SUBDIVISION OF ICE CREAM AND ANALOGOUS PRODUCTS
Filed July 1, 1933      16 Sheets-Sheet 14

INVENTORS
Clarence W. Vogt
Paul Phelps
BY
ATTORNEYS

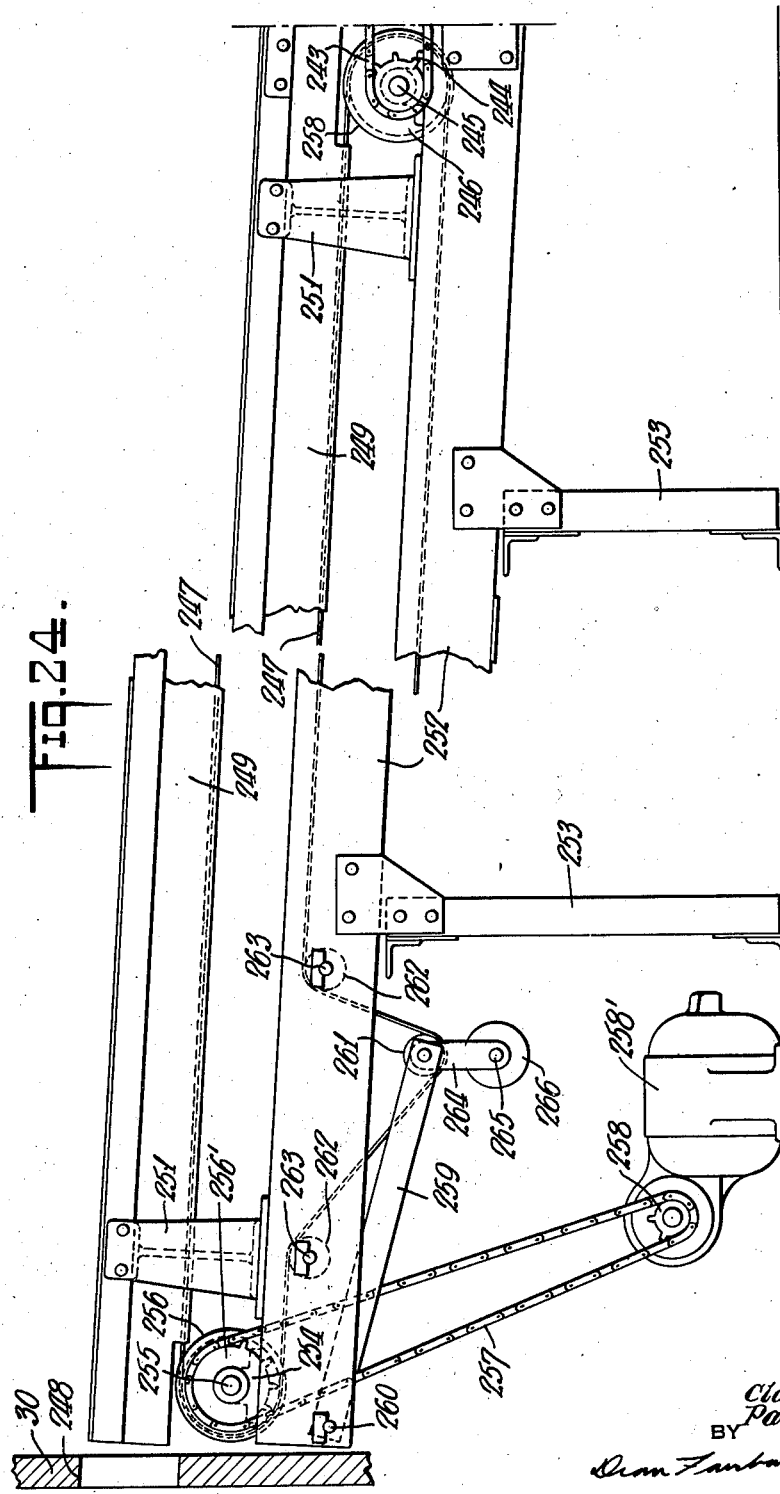

Jan. 7, 1936.    C. W. VOGT ET AL    2,027,255
APPARATUS AND METHOD FOR CONTINUOUS SOLIDIFICATION AND
SUBDIVISION OF ICE CREAM AND ANALOGOUS PRODUCTS
Filed July 1, 1933    16 Sheets-Sheet 16
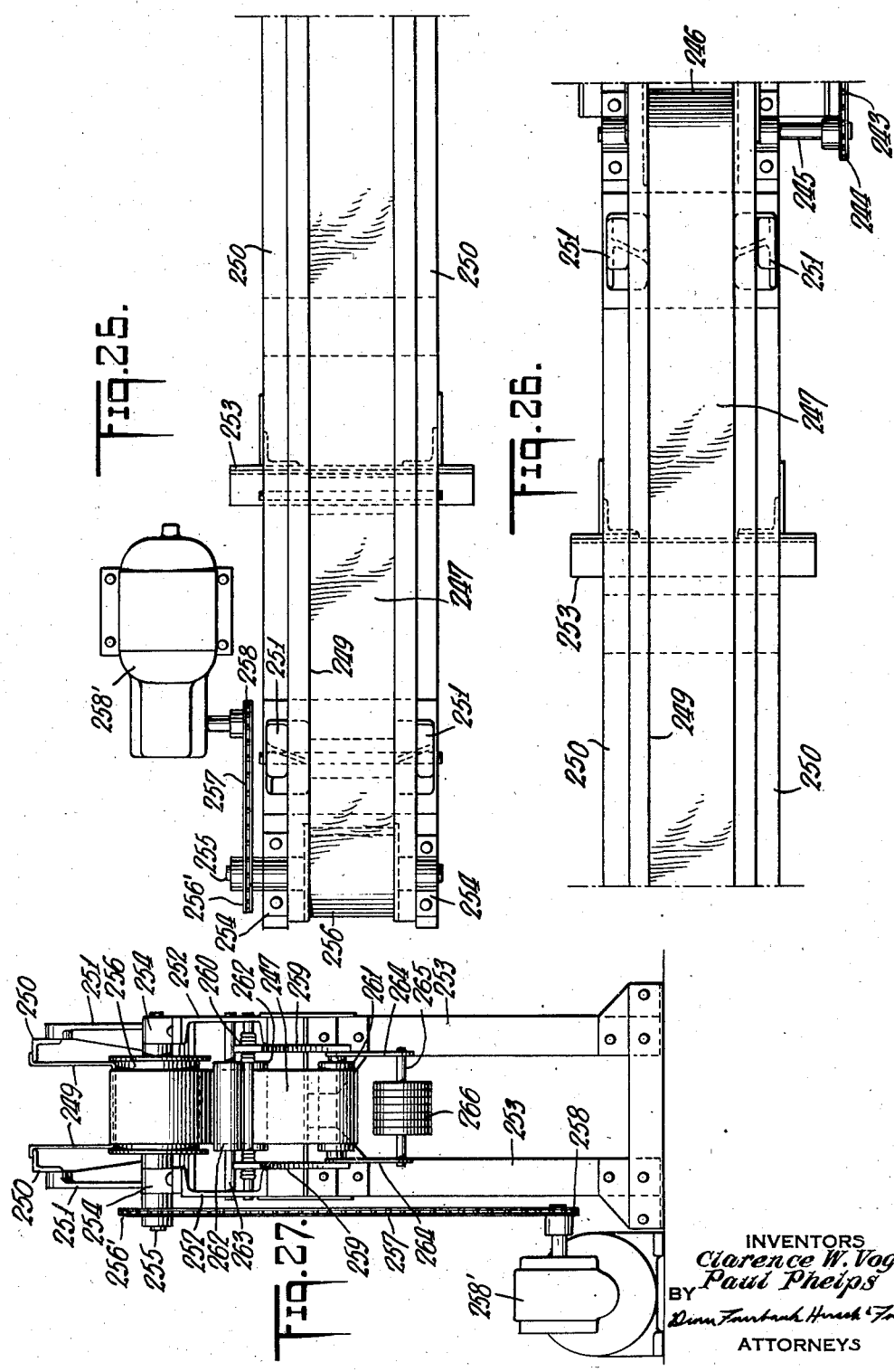
INVENTORS
Clarence W. Vogt
Paul Phelps
BY
ATTORNEYS Patented Jan. 7, 1936

2,027,255

UNITED STATES PATENT OFFICE 2,027,255

APPARATUS AND METHOD FOR CONTINUOUS SOLIDIFICATION AND SUBDIVISION OF ICE CREAM AND ANALOGOUS PRODUCTS

Clarence W. Vogt, Louisville, Ky., and Paul Phelps, Pleasantville, N. Y., assignors, by mesne assignments, to Vogt Processes, Incorporated, Louisville, Ky., a corporation of Delaware Application July 1, 1933, Serial No. 678,624

39 Claims. (Cl. 62—114)

This invention is an improvement on the apparatus and process disclosed and broadly claimed in the prior Vogt Patents 1,810,740 and 1,810,864, issued June 16, 1931.

The present invention relates more particularly to the apparatus and process of continuous solidification of the bar or stream of ice cream or other analogous material, and the subdividing of it into blocks, bricks or other sections.

In the specific constructions illustrated in the prior Vogt patents above referred to and the Vogt Patent 1,810,863, the delivery of the ice cream, the continuous hardening of the same, and the subdividing of the hardened bar are disclosed as a straight line operation. In order to obtain large hourly production the rate of flow must be increased or the cross-sectional area of the bar must be increased. The latter requires correspondingly longer time for hardening and in either event there must be a correspondingly longer room to permit of the final hardening in a straight line operation.

The main object of this invention is to effect a complete mechanization of the operations of hardening and subdividing for a plant of relatively large capacity and without necessitating an increased length of the hardening room.

The invention in the form illustrated provides for the hardening and subdividing of continuously formed bars of ice cream, the partially frozen material being encased in a continuously formed wrapper of paper or the like and the enwrapped hardened bars being cut into successive sections.

If the apparatus be employed in connection with ice cream, the mix is first partially frozen, preferably in a freezer of the type in which the mix is continuously forced through under pressure, such as for instance as the type of freezers shown in the prior Vogt Patents 1,783,864, 1,783,865, 1,783,866 and 1,783,867, issued Dec. 2, 1930 and 1,847,149, issued Mar. 1, 1932, and is then encased in a wrapper continuously formed from sheet material, as for instance, by the apparatus shown and claimed in the prior Vogt Patent No. 2,006,375, issued July 2, 1935. The hardened enwrapped sections produced by the apparatus disclosed in the present application may be further subdivided and packaged by the apparatus shown and claimed in the Vogt application Serial No. 658,264, filed Feb. 23, 1933. The short enwrapped sections may be of suitable size for use as individual service portions and may be of the form and character disclosed and claimed in the Vogt Patent 1,906,183, issued April 25, 1933.

If the bar and final product be cylindrical and of a diameter of approximately 2 inches, it requires about 20 minutes to effect satisfactory hardening when the mass is subjected to a temperature in the order of from 20° to 30° below zero. If the capacity of the plant be such that the ice cream bar is produced and advanced at the rate of about 60 feet or more per minute, a hardening room at least 200 feet long would be required to effect such hardening if the bar be continuously advanced in a straight line.

As one important feature of the invention the bar after being only partially hardened is cut into relatively long lengths, for instance in the neighborhood of 14 feet, and these long sections are then advanced in a direction at right angles to the direction of travel of the incoming material and at a comparatively slow rate so that the long sections are juxtaposed relatively close together in parallelism during the further or deep hardening of the bar. The speed of the deep hardening conveyer is such that by the time the bars have reached the end of the delivery run of said conveyer, they have been sufficiently hardened. They are then severed into shorter lengths and delivered from the hardening room, preferably in a direction substantially parallel to the direction of the incoming bar and conveyed to the packaging apparatus. These shorter bars may be of the length of the individual service portions or may be of a multiple of such lengths so that further subdividing is required.

By means of the complete apparatus the plastic mass of ice cream issuing from the continuous freezer is wrapped, hardened, subdivided into individual service portions, and packaged ready for delivery after less than one-half an hour from the time the mix enters the freezer.

The present invention although preferably used as a part of such a complete system may be employed as a part of other systems or for other purposes, it being understood that the form hereinafter described more in detail is merely a typical example of one commercial form and that various other forms may be designed and especially adapted for use in the treatment of ice cream, water ice, sherbet or other partially frozen or solidified comestible which are normally liquid at room temperature, or with other types of materials which it may be desired to harden and subdivide.

By means of our invention we effect a complete mechanization of the hardening and at least a portion of the subdividing which occupies the very minimum of hardening room space and which is entirely automatic and reliable in its operation.

Although the form illustrated is designed for use with cylindrical bars, it will be obvious that the details of the apparatus may be readily modified to adapt it for bars of any other desired cross-section.

As one feature of the present invention there is provided a conveyer of such form and length that it provides adequate traction effect on the bar to draw it into the hardening room from the forming and filling mechanism and which will also permit and facilitate the partial or case hardening during such straight line endwise movement.

A further object is to provide automatic operating mechanism which will subdivide the entering bar into long sections and transfer such sections to another conveyer operating in a direction at right angles to the direction of movement of the first mentioned conveyer.

A further object is to provide a deep hardening conveyer which will properly support and advance the long sections at such a rate and while facilitating and permitting the further hardening that the bars will be thoroughly hardened to the desired extent when delivered from this conveyer.

A further object of the invention is to provide mechanism operating automatically to subdivide the long sections into shorter sections and transfer them to a third conveyer by which they may be conveyed from the hardening room to the packaging mechanism.

By means of our improved construction it is not necessary that any workmen be employed in the hardening room or at any point where they are subjected to the low temperature required for effecting the hardening.

The incoming and outgoing conveyers may be operated at the same rate so that the hardened sections are delivered as rapidly as the material is introduced to the hardening room and the inlet to and the outlet from the hardening room may be relatively close together so that the workman supervising the operation of the primary freezer may at the same time readily observe the final product as it is produced. If desired the incoming and outgoing conveyers may lead from opposite walls of the hardening room if it be desired to have the primary freezing and the packaging operations in separate rooms with the hardening room therebetween.

Various other advantages, objects and important features will be pointed out hereinafter or will be apparent from a consideration of the specific embodiments hereinafter described and which are illustrated in the accompanying drawings.

In these drawings:

Fig. 1 is a highly diagrammatic plan view of those parts of the apparatus which are located within the hardening room and showing schematically the driving and synchronizing means for the various conveyers.

Figs. 1a, 2, 3, and 4 taken together are broken side elevational views, with parts in section for clearness, showing the portions of the apparatus which receive the continuously extruded wrapped bar of ice cream and convey it in a straight line, said section being taken lengthwise of Fig. 1 adjacent to the upper side of Fig. 1. Of these figures, Fig. 1a shows the intake end of the conveyer and a part of the case hardening chamber; Fig. 2 is a lateral extension at the right hand end of Fig. 1a and showing the remainder of the case hardening chamber and conveyer mechanism and also the intermittently acting mechanism for severing long lengths of material from the continuously moving case hardened bar; Fig. 3 is a lateral extension of the right hand end of Fig. 2 showing partly in elevation and partly in section the bar drop carriage and its associated mechanism for depositing the long case hardened bars on the deep hardening conveyer; and Fig. 4 is a lateral extension of the right hand end of Fig. 3 showing the end of the bar drop carriage and part of the drive mechanism for the deep hardening conveyer which appears in section.

Fig. 5 is an end view of the right hand end of Fig. 4, showing the receiving end of the deep hardening conveyer, the upper part of said view being in section.

Fig. 6 is a top plan view partly broken away of the parts shown in side elevation in Fig. 1a.

Fig. 7 is a plan view of the parts shown in side elevation in Fig. 2.

Fig. 8 is a plan view of the parts shown in side elevation in Fig. 3.

Fig. 9 is a plan view of the parts shown in side elevation in Fig. 4.

Fig. 10 is an enlarged vertical sectional view taken on the line 10—10 of Fig. 7, with the cutter at the lowest point of its cutting movement.

Fig. 11 is a side elevation of the mechanism shown in Fig. 10, but with the cutter raised and immediately after the cutting and before returning to normal rest position.

Fig. 12 is a top plan view of the cutter mechanism shown in Figs. 10 and 11.

Fig. 13 is a transverse sectional view on the line 13—13 of Fig. 10 and on a larger scale.

Fig. 14 is a transverse sectional view showing the details of the case hardening conveyer and taken on the line 14—14 of Fig. 1a and on a larger scale.

Fig. 15 is a horizontal section showing details of the tab folding mechanism which is arranged in advance of the saw and beyond the case hardening conveyer.

Fig. 16 is an end elevation of the delivery end of the deep hardening conveyer, viewed from opposite to that illustrated in Fig. 5 and also showing the mechanism for receiving the long deep hardened bars and severing them into shorter lengths, and also showing part of the conveyer mechanism for carrying the severed lengths out of the hardening room.

Fig. 17 is a broken vertical sectional view through the upper run of the deep hardening conveyer showing the housing through which cold air is directed around the carrying run of the conveyer. This view is taken on the line 17—17 of Fig. 5.

Figs. 18, 19, and 20 taken together are front elevational views facing the delivery end of the deep hardening conveyer and showing in part the mechanism for cutting the long deep hardened bars into shorter lengths and the mechanism for conveying such lengths out of the hardening room. These views are taken looking upwardly from the bottom of Fig. 1, and Fig. 19 constitutes an extension at the right hand end of Fig. 18, and Fig. 20 constituting an extension at the right hand end of Fig. 19.

Fig. 21 is a top plan view of the parts illustrated in Fig. 18.

Fig. 22 is a top plan view of the parts illustrated in Fig. 19.

Fig. 23 is a top plan view of the parts illustrated in Fig. 20.

Fig. 24 is a broken side elevational view of the extension conveyer which coacts with the conveyer illustrated in Figs. 18 to 23 inclusive, this view being taken as an extension at the left hand end of Fig. 18.

Fig. 25 is a top plan view of the left hand end of the conveyer shown in Fig. 24.

Fig. 26 is a top plan view of the right hand end of the conveyer shown in Fig. 24, and Fig. 27 is an end elevational view of the conveyer shown in Fig. 24.

*Case hardening conveyer (Figs. 1a, 2, 6, 7, and 14)*

The insulated wall 30 of a hardening room or chamber is provided with an opening 31 through which a paper wrapped rod or stream of ice cream 32 in plastic or semi-plastic condition is continuously fed from a continuous freezer of the character shown in the Vogt Patents 1,783,864 and 1,783,865, or from any other suitable source of continuous supply, such as a hopper if the latter have a pump or other means for insuring the feeding of the material of the desired stiffness.

Arranged just inside of the wall of the hardening room is a frame structure 33 and coacting with a second skeleton frame structure 34 (Fig. 2) to support runways upon which the case hardening conveyer is adapted to travel. This conveyer includes two endless articulated chain structures, the working runs of which lie in close proximity to each other and move in the same direction. The upper working run of the lower endless section of the case hardening conveyer travels on a pair of spaced horizontally disposed angle iron tracks 35, the ends of which are connected to the frames 33 and 34. These tracks, as well as the tracks for the other runs of the conveyers, may be additionally braced, if desired, by standards 36 disposed between the frames 33 and 34 and connected by horizontal bracing bars 37 with the latter frame.

Details of the case hardening conveyer may be best seen from Fig. 14. The two endless sections which cooperatively constitute the conveyer are similar. Each section includes two spaced parallel chains formed of a series of pivotally connected links 38. Each link consists of a pair of spaced parallel arms pivotally connected to the corresponding arms of an adjacent link by a pivot pin 39. Bushings 40 encircling the pivot pins 39 afford bearings for traction rollers 41 which travel on the tracks 35. At or adjacent each of the link pivots one of the link arms is provided with an inwardly extending integral angular bracket portion 42. Mounted upon these two opposed brackets 42 is a carrier 43 and consisting of a semi-circular body portion 44 to half encase the bar 32 of ice cream. These body portions are preferably of highly conductive metal and are provided with a number of radially extending fins 45, to facilitate the radiation of heat to a cold air current, in a manner to be later described. The bodies 44 are connected by legs or flanges 46 secured to the brackets 42 by screw bolts 48.

The two legs 46 of each body 44 include angularly disposed paper gripping portions 49 located in substantially parallel planes and coacting with similarly inclined portions on the legs of the complementary carrier 43 to clamp between them the projecting paper tabs 50 which protrude from the wrapper 51 of the ice cream bar 32. This wrapper is applied in two sections, the edges of each section overlapping the edges of the other, and each section affording a laterally extending tab 50, as shown in the Vogt Patent 1,906,183. These tabs being diametrically opposite each other afford convenient projections which may be frictionally gripped between the legs 46 of the complementary casting members 43, 43.

The clamping action of the tabs may be entirely due to the weight of the upper conveyer or may be due to the engagement of the rollers 41 of the upper endless section of the case hardening conveyer pressing against the corresponding inverted tracks 35a disposed above and in parallelism with tracks 35. The only difference other than length between the upper and lower endless sections of the case hardening conveyer is the provision on the lower conveyer, at equal intervals of about 14 feet apart, of studs 52, substituted for the screw bolts 48 and adapted to intermittently actuate the bar drop carriage which will be later described.

The frame 33 supports upper and lower bearing brackets 53 and 54 (Fig. 1a) carrying cross shafts 55 and 56 on which are journaled pairs of idler sprocket wheels 57 and 58. The two articulated chains of the lower endless section of the case hardening conveyer pass around the lower sprockets 58 and the chains of the upper endless section of the conveyer pass around the sprockets 57. The idle return run of the upper conveyer section travels in trackways 59 supported by the two frames 33, 34 and the standard 36, and corresponding to the trackways 35 and 35a. Upon the frame 34 there is mounted a cross shaft 60 having fixed thereto a driven sprocket 61 and a pair of larger driving sprockets 62, 62 (Figs. 2 and 7), the latter sprockets engaging the chains of the upper section of the case hardening conveyer and actuating the conveyer.

The idle return run of the lower conveyer section travels in guideways 63 supported by the frames 33, 34 and the standard 36 and corresponding to guideways or trackways 35. This lower section is driven from a pair of sprocket wheels 64 fixed upon a shaft 65, journaled in suitable bearings 66, carried by the frame 34.

Both endless sections of the case hardening conveyer are driven at the same speed due to the use of synchronizing mechanism. This includes a driving pinion 67 (Fig. 1a) supported on a shaft 68 rotating in bearings 69 carried by frame bar 37. A chain 70, shown in dot and dash lines, connects the pinion 67 and a sprocket wheel 71 on a countershaft 72 having suitable bearings in the frame 34. A sprocket wheel 73 (Fig. 7) on this counter-shaft and of the same size as the sprocket wheels 71 and 61, drives the sprocket 61 through a sprocket chain 74. On the end of the shaft 72 opposite the sprockets 71 and 73 is mounted a gear 75 of the same size as the sprocket wheel 61 and which drives a gear 76 on the shaft 65 at a one-to-one ratio. Thus the sprocket wheels 62 and 64, which are identical in size, are driven through the synchronizing and driving mechanism, just described, at uniform and equal speeds from the driving pinion 67. The speed of travel of the case hardening conveyer is of course set to coincide with the speed of delivery of the plastic rod of material to such conveyer.

The tracks 35 and 35a have the vertical spaces between them closed by side plates 77. The horizontal spaces between them are closed at the bottom and top by trough-like members 78 having flanges 79 at each side, bolted as at 80, to the trackways. Preferably the bolts 80 also serve to hold in position angle-shaped thin gauge metal pieces 81 presenting vertical flanges which form a continuation of the vertical walls of members 78 and terminate adjacent to the brackets 42. Thus the working runs of the case hardening conveyer are completely enclosed in a housing defined by the plates 77 and 78, which housing opens into the hardening room at the end at frames 33 and 34.

In Figs. 1a and 6 there is shown a duct 82 communicating through hoods 83 with the casing which encircles the working runs of the case hardening conveyer. Cold air blown through the duct 82 escapes from the open ends of the case hardening conveyer casing 77, 78. Thus the wrapped bar of ice cream is subjected to a constantly moving current of cold air during the entire period of its passage from the frame 33 to the frame 34. Inasmuch as the fins 45 of the receiving casting 43 are of highly conductive material heat interchange between the surface of the progressing ice cream bar and the cold air which is flowing around the conveyer is effected very rapidly so that the bar, by the time it reaches the end of the chamber 77, 78, is sufficiently case hardened to be severed by a saw or other cutter without danger of unduly mashing or mutilating the bar, and without any substantial, if any, oozing of the cream from the cut ends. If the material delivered to this case hardening conveyer be of sufficient stiffness so that little or none of the material will ooze out of the wrapper when the end of the bar is cut off, it is not necessary to deliver a blast of cold air along the jacket to effect any case hardening, and likewise the provision of the radiating fins on the conveyer is unnecessary and the conveyer may be made very much shorter.

*Bar drop carriage and actuating means therefor (Figs. 2 to 5 and 7 to 12 inclusive)*

The cut-off mechanism which severs the continuously advancing case hardened rod into relatively long lengths for passage through the deep hardening chamber and which will later be described, is mounted on a bar drop carriage mechanism. This carriage has means for actuating the carriage and releasing the cut bars.

The framework for supporting the bar drop carriage includes a pair of horizontally disposed outwardly facing spaced parallel channel bars 84, disposed at approximately the same elevation as the working runs of the case hardening conveyer. Each bar is supported at one end by the frame 34 and at its other end by a supplemental vertical frame 85. (Figs. 4 and 5.)

At intervals along the inner faces of the bars 84 there are mounted short horizontally disposed ledges or track supports 86 which may be in the form of angle irons. (Fig. 5.) The bar drop carriage proper includes a pair of long parallel spaced inwardly facing horizontally disposed channel bars 88, connected at intervals by suitable cross braces 89. The left hand end of this bar drop carriage terminates above and slightly to the left of the shaft 72 (Fig. 2) when the carriage is in its normal retracted position.

Projecting laterally at intervals from the frame bars 88 are spindles 90 carrying flanged traction wheels 91 which travel on tracks 92 supported on the ledges 86. (Fig. 5.) These traction wheels and their spindles (Figs. 5 and 8) may be disposed within brackets 93 fixed upon the bars 88. Certain of the connective cross pieces 89 carry pendant studs 94 on which are swiveled the hubs 95 of crank links 96, said crank links at their opposite ends having pendant hubs 97 receiving upwardly extending studs 98 on a pair of horizontally disposed plates 99.

The adjacent edges of these plates abut (Fig. 5) and are curved to cooperatively define a groove in alignment with the case hardening conveyer and in which the ice cream bar rests and along which it is guided after it leaves the case hardening conveyer.

Mounted upon the bar drop carriage (Fig. 2) is a cut-off mechanism, indicated generally at C. This cut-off mechanism includes a vertically movable motor driven circular saw S (Figs. 10 and 11) which is raised and lowered intermittently to sever long lengths of case hardened ice cream from the bar. The plates 99 which support the case hardened end of the bar are adapted to be separated after each cutting operation to drop the severed bars onto a deep hardening conveyer, indicated generally at D. (Fig. 5.) Means is provided for intermittently moving the bar drop carriage in the direction of travel of the ice cream bar and at the same speed as the bar so that the saw S is traveling at the same rate of speed as the bar at the time the cut is made.

It is for the purpose of imparting this short intermittent longitudinal movement to the bar drop frame that we have provided the studs 52 on the lower section of the case hardening conveyer. The means by which these studs engage and advance the bar drop is shown in Figs. 2, 10, 11, and 12. A pair of bearing brackets 100 projecting rearwardly from the bar drop frame, that is projecting toward the wall of the hardening room, journal a rock shaft 101. (Fig. 12.) Intermediate the ends of this rock shaft are fixed a pair of crank arms 102, each carrying a downwardly extending stud 103 at its free end. (Figs. 2 and 11.) Studs 103 are adapted to be engaged by the studs 52, which are arranged typically at 14 foot intervals along the case hardening conveyer. At one end of the shaft 101 we fix a third crank arm 104 carrying a roller 105 in its free end. This roller coacts with a cam structure, shown in side elevation in Figs. 2, 10, and 11, to lift the studs 103 out of engagement with the studs 52 after the bar drop carriage has been moved a predetermined distance by the latter studs.

Such cam structure includes a bracket 106 mounted upon a frame member 107 of the frame 34. The lower portion of the bracket carries a track 108 for the roller 105, the track at one end terminating in an upwardly inclined cam portion 109. As the roller 105 rolls up the cam 109 it will rock the shaft 101, elevate the free ends of the crank arms 102 and move the studs 103 clear of the studs 52.

Arranged above the track plate 108 and also fixed to the bracket is a plate 109a and the free cut-away end 110 of which coacts with cam 109 to limit the upward movement of the roller 105, thereby preventing this roller from jumping over the cam under the momentum of the moving bar drop carriage.

The means for returning the bar drop carriage to its normal position after the studs 52 have passed beyond the studs 103 may comprise a counterweight 111 hung on a chain 112, the latter partly encircling and secured to a sprocket wheel 113 fixed upon a shaft 114, carried in bearings 115 on a vertical portion of the frame 34. Shaft 114 also carries a smaller sprocket wheel 116 partly encircled by and secured to a sprocket chain 117 having an end connected as at 118 to the bar drop carriage.

The counterweight actuated return movement of the bar drop carriage may be retarded, if desired, by the use of a dashpot of any desired type. (Figs. 3 and 8.) For illustrative purposes we have shown it as consisting of a fixed cylinder 121 carried by a cross brace 120, connecting the frame bars 84. A movable piston 119 is encased in the cylinder 121 and connected to the carriage so that it moves with the latter as the carriage is carried forward by the studs 52, but retards the movement of the carriage in the opposite direction. The end of the cylinder may have a petcock to regulate the rate of escape of the air during the return movement.

The means for effecting relative separation of the support plates 99, 99 includes a pair of bell crank levers 122 (Fig. 8) fixed intermediate their ends on vertical studs 123 carried by one of the cross pieces 89 which connect the frame members 88 of the bar drop carriage disposed parallel to the crank link 96. Also fixed on the studs 123 are crank arms 124. With the bar drop carriage in the position shown in Figs. 7 and 8 a coiled contractile spring 125 connecting a pair of studs 126 on the plates 99, 99 holds these plates together and when the bar drop is in its normal position of rest bell crank levers 122 impinge against abutment screws 127 also fixed in brackets on the cross member 89.

Brackets 128 extending inwardly from the frame bars 84 carry adjustable screws 129 adapted to coact with the crank arms 124 as the bar drop carriage has nearly completed its movement under the influence of the driving studs 52. The rollers 130 at the ends of the arms 124 will, at that time, engage the screws 129, thereby compelling movement of the bell crank levers in a direction to effect separation of the plates 99, 99, against the action of their retaining spring 125. The links 96 hold said plates in parallelism during said separating movement. The extent of the movement is sufficient to permit the case hardened bar which has been cut off by the mechanism about to be described, to drop down onto the deep hardening conveyer.

*Mechanism for cutting long sections from bars*
*(Figs. 7 and 10 to 13)*

Rising from the tops of the bars 88 and within the confines of the frame 34 are a pair of plates or castings 131, said plates at their inner faces carrying channels 134 defining vertical tracks in which reciprocate the wear members 132 of a vertically movable cross head 133. (Figs. 12 and 13.) Secured to the bottom of the cross head is a support 135 for an electric motor 136, which drives the spindle 138 of a circular saw S, through a suitable reduction gearing 137. A saw housing or guard 139 of sufficient height to provide clearance for movement of the saw is suspended by hangers 140 from brackets 141 integral with the plates 131. The plates 131 are connected by a pair of cross webs or cross pieces 142 and 143. A lever 144 pivoted in a bracket 145 upstanding from the cross piece 142 has a shorter end connected by link 146 to the cross head and on its longer end there is adjustably mounted a counterweight 147. This counterweight normally acts to maintain the cross head and the saw in elevated position. (Fig. 11.)

Pivotally mounted intermediate its ends, as at 148 in a bracket 149 rising from the cross piece 143, is a lever 150. This lever is connected by link 151 through arm 152 with the cross head 133, and the extremity of the lever carries a roller 153 for coaction with a cam 154. This cam is pivotally mounted at 155 upon a bracket 156 fixed to one of the upper cross pieces of frame 34. The mounting of the cam is such that it is restrained against movement in a counterclockwise direction under the influence of the roller 153, but is free to move in a clockwise direction.

Thus the arm of the lever which carries the roller 153 will be depressed by the cam as the roller passes to the right but as it returns to the left the cam will lift under the influence of the roller permitting the latter to slide by it. The other end of the lever 150 terminates in a downwardly inclining arm portion 157 carrying at its free end a roller 158 which may abut against a cross piece 159 on the frame.

The operation of the above described mechanism in effecting the depression and elevation of the continuously rotating saw S at times when the bar drop carriage is shifted to the right, is as follows:

The cross head is normally held in the elevated position of Fig. 11 by the counterweight 147 and the saw is thus held out of the path of the case hardened bar of ice cream which is passing below it. When, however, a lug 52 of the case hardening conveyer engages the stud 103 of the bar drop carriage, and the bar drop carriage starts moving to the right, roller 153 will engage the cam 154, rocking the lever 150 in counterclockwise direction about its pivot 148 against the action of the counterweight, thereby positively forcing the cross head 133 downwardly and moving the saw into and through the bar of ice cream. The rate of movement of the bar drop carriage upon which the saw is mounted and the rate of movement of the ice cream to be severed, are the same since both are being driven from the case hardening conveyer. As the roller 153 passes under the nose of the cam 154 the counterweight will come into play and elevate the cross head and the saw and restore the parts to the position of Fig. 11.

The only function of the lever arm 157 and its roller 158 is as an emergency device and it comes into play only if and when the counterweight should fail to work. Projecting from the frame 34 are a pair of arms 160 connected at their outer ends by a cross piece 159. In the event that the counterweight fails to operate, roller 157 will engage the cross piece 159 and act through the lever 150 to reelevate the cross head 133, this action occurring while the bar drop carriage is still in motion toward the right and preventing injury to the saw or jamming of the mechanism.

As the bar drop carriage returns under the influence of its counterweight 111, the cam 154 which is free to tilt in clockwise direction, will simply be thrust aside by the roller 153 and drop back into position ready for the next operation of the saw mechanism.

Inasmuch as the projecting paper tabs 50 might interfere with proper operation of the saw, means is provided for at least temporarily folding these tabs inwardly against the body of the ice cream bar just before the bar reaches the saw S. This mechanism includes a fixed circular collar 161 arranged just in advance of the saw blade and carried by a pendant bracket 162. This collar completes the tab folding operation which has been initiated by a folding mechanism arranged in advance of the collar and illustrated in detail in Fig. 15. A cross member 163 forming part of the frame 34 has a bracket with an opening therein through which the ice cream bar passes. At opposite sides of the opening the cross member is provided with elongated slots 164, through which pass screw bolts 165 carrying bracket 166. The slots 164 permit adjustment of these brackets toward or away from the ice cream bar. These brackets have portions of right angular cross-section extending downwardly, one leg of which is provided with a rectangular aperture 170 through which passes a spring arm 169 of rectangular cross-section, and carrying at their free ends blocks 171 adapted to serve as folding guides for turning the angularly disposed paper tabs inwardly against the body of the ice cream bar. The other leg of the right angular portion is provided with a stud 167 on which is pivotally mounted a locking plate 168 adapted to enter a corresponding groove in the end of the spring arm 169 to position the latter and secure same in a manner to permit quick and easy removal.

*Deep hardening conveyer (Figs. 2, 3, 4, 5, 9, 16, and 17)*

The long case hardened bars drop but a slight distance from between plates 99, 99 onto a flight F of the deep hardening conveyer D which carries these long bars slowly through an intensely cold deep hardening chamber. The conveyer D need only move a sufficient distance between bar cutting operations to shift the previously deposited bar out from under the bar drop plates and present a new flight for the reception of the next bar. This endless conveyer travels in a direction at right angles to the direction of travel of the case hardening conveyer and in the illustrated embodiment of the invention at a speed of 1/42 of said speed and in timed relation therewith.

The supporting means for the receiving end of the deep hardening conveyer is mounted partly on the frame 85 and partly upon a second frame 172 (Fig. 2) disposed laterally of frame 34 and rigidly connected to the latter by bracing plates 173. Bearing blocks 174, 174 mounted on frames 85 and 172 journal a shaft 175 near the ends of which are mounted sprocket wheels 176. The peripheries of these wheels are notched at 177 to receive the rollers 178 provided at the connecting pivots between the links of a pair of spaced parallel sprocket chains 179. The ends of the flights F of the conveyer are fixed to these two chains 179. Each flight includes a trough forming carrier 180 of lesser length than the bars to be carried. Radially extending fins 181 extend the full length of each carrier 180 and each carrier at its ends is provided with positioning members 182, rigidly secured in any suitable manner (not shown) to the centers of the links of the respective chains 179. Instead of fins we might in some cases provide brine receptacles which absorb latent heat from the bars on the upper run and give it up during the return run as disclosed in the Vogt Patents 1,810,740, 1,810,863, and 1,810,864.

A pair of supplemental frame members 183, 184 (Fig. 9) are arranged forwardly of frames 85 and 172. These frames mount bearing blocks 185 (Fig. 16) journaling a cross shaft 186 which carries sprocket wheels 187 corresponding to sprockets 176 and around which the forward or delivery portions of the chains 179 travel. The rollers 178 of both the working runs and the idling runs of chains 179 are supported on upper and lower trackways 188 and 189. These trackways are supported at their rear ends on frames 172, 85 and at their forward ends by frames 183, 184 and may conveniently comprise ordinary angle irons, the horizontal flanges of which serve as the supporting tracks.

Fig. 17 shows the upper working run of the deep hardening conveyer in cross-section. It illustrates the supplemental horizontal frame bars 190 which brace the support frames for the conveyer sprockets and tracks and also illustrates the cold air duct 191 through which the cut bars of ice cream are slowly advanced to effect their complete hardening. This duct is open at one side as indicated at 192 and is also open at both ends. The flue 193 through which intensely cold air is forced into the duct is also shown in Fig. 17.

The bottom of duct 191 is formed by a series of plates 194 resting on the frame bars 190 and the top of the duct is formed by a series of shallow removable plates or pans 195 resting upon cross frame members 196, the ends of which are supported by frame bars 197 also connected to the front and rear sprocket carrying frames of the deep hardening conveyer and disposed just above trackways 188.

Where frame members 197 and trackways 188 pass through the flue 193 (Fig. 17) they are connected by a baffle plate 198 so that part of the cold air from flue 193 passes onto the top of duct 191 through opening 199 between the frame 197 and the top forming pans 195, against the bars of ice cream. Part of the incoming air passing around the baffle 198 is directed by a second horizontal baffle member 200 against the fins 181.

The use of removable plates or pans to form the top wall of duct 191 permits movement of the working run of the conveyer for purposes of inspection or repair.

*Transfer and subdividing mechanism for deep hardened bars (Figs. 16 and 18 to 23 inclusive)*

Forward extensions 201 (Fig. 16) of the frames 183 and 184 have members 216 supporting plates 215a carrying brackets which have bearings 202 for a shaft 203, the axis of which is parallel to the axis of the conveyer flights F, this shaft being disposed beyond the end of the deep hardening conveyer and carrying a plurality of transfer wheels 204. These transfer wheels are arranged in pairs (Figs. 18 to 21) on the shaft 203 leaving only sufficient clearance between them to accommodate the reciprocating saws 205 which operate to subdivide the long deep hardened bars into shorter sections of predetermined length. In the present embodiment of the invention nine pairs of transfer wheels are provided and nine saws are provided, these saws being operable to cut the fourteen foot ice cream bars into eight shorter sticks approximately twenty inches in length. In some cases a few inches of each end of the bar representing excess material may be cut at the ends of the series of accurately cut twenty inch bars and which may be returned to the freezer for reprocessing. If the saw S be slightly heated and the cream be sufficiently hard, the saw S may make clean cuts and no waste will be later cut from the ends.

Each transfer wheel 204 is provided with a series of peripheral notches 206 of suitable size and shape to receive one of the frozen bars of ice cream and transfer them to the saws. In the form shown each transfer wheel has five notches spaced apart at such distance in respect to its peripheral speed and the speed of travel of the flights of the hardening conveyer, that there will always be a series of transfer wheel notches ready to receive each bar as it comes from the conveyer. All of the transfer wheels are secured to the shaft 203 with the notches of the respective wheels in alignment, so that the notches cooperatively provide a cradle to receive a bar delivered from the conveyer.

As shown in Fig. 16 the bars fall by gravity out of the conveyer flights as the conveyer chains 179 move them around the sprockets 187. They roll down an inclined plate 207, the lower edge of which terminates closely adjacent to the transfer wheel 204 so that the bars cannot fall between the transfer wheels and the plate but rest against the surface of the transfer wheels until a set of notches is presented to receive them, whereupon the bars fall by gravity into the notches.

In order to eliminate any possibility of improper operation such as might be caused by the bars becoming frozen to the flights of the conveyer, the upper edge of the inclined plate 207 terminates very closely adjacent the point where the conveyer flights reach their outermost position and this plate is operative to engage any bar which may have become frozen and pick it off its supporting flight.

A driving sprocket 208 for the transfer mechanism is keyed upon the end of the shaft 203 and driven in timed relation with the deep hardening conveyer and the case hardening conveyer as will be more clearly pointed out when we describe the driving and synchronizing mechanism shown diagrammatically in Fig. 1. A cross member 209 supported by member 209a is positioned by verticals 209b attached at intervals at their lower ends to one of the frame bars 215 and carries a plurality of depending arcuate fingers 210 which lie closely adjacent the peripheries of the transfer wheels and prevent the bars from falling out of the transfer wheels as they are being carried to the saws. The lower ends of these plates also guide the shorter bar sections which result from subdivision of the bar by the saws onto a conveyer belt 211, this belt being disposed under the shaft 203 and in parallelism with the case hardening conveyer, but moves the sections of the subdivided bar in a direction opposite to the direction of movement of the ice cream through the case hardening conveyer. In other words the conveyer belt 211 operates to carry shorter sections of ice cream of predetermined length out from under the transfer and subdividing mechanism and back toward the wall through which the cream entered the hardening chamber. The details of this conveyer and a supplemental conveyer which cooperates therewith will be more fully described hereinafter.

Longitudinally extending angle iron sections 212 are supported on brackets 214 rising from plates 215a. Suspended from bars 212 is a U-shaped trough member 213 supporting the working run of the conveyer belt 211. It is into this trough that the lower ends of the plates 210 direct the sections of the subdivided bars, the trough preventing the bars from rolling off the conveyer belt 211.

Brackets 217 and 218 are secured to the outer face of the outer frame bar at intervals corresponding with the intervals between the pairs of transfer wheels, and support bearing blocks 219 and 220 in which are journaled longitudinally extending rock shafts 221 and 222, shaft 221 being disposed directly above but parallel with the shaft 222 since the brackets 217 rise to a greater height than the brackets 218. The upper rock shaft 221 carries a plurality of dependent crank arms 223 and the lower rock shaft 222 carries a plurality of upwardly extending crank arms 224. Connected to these crank arms through pivoted links 227 are horizontal arms 225 constituting part of the carriages for the saws 205. All of the arms 225 whether connected to the crank arms 223 or 224, are disposed in the same horizontal plane. They extend under the upper run of the conveyer 211 and from the ends of these arms rise standards 226 in the upper ends of which are carried saw blades 205, the latter being typically of bread knife formation at their cutting edges and the tension of the saws being regulated by wing nuts screwed onto threaded extensions 228 of the saw blades and bearing against the outer faces of the outer standards 226.

Means is provided for continuously oscillating the rock shafts 221 and 222 in relatively opposite directions so that adjacent saws 205 are always moving in directions opposite to each other. Thus the stresses on the frozen bars during subdivision of the latter, are substantially equalized and the saws will have no tendency to bounce the bars about or knock them against the walls of the transfer wheel notches 206 or the guide plates 210.

The means for actuating the shafts 221 and 222 is most clearly shown in Figs. 16, 19, and 22. It includes a motor 229 operating through a speed reduction gearing 230 to drive a shaft 231 carrying at opposite ends a pair of crank plates 232 to which are pivotally connected pitmen 233. The lower ends of the pitmen are mounted on studs 234 and the upper ends of the pitmen include hubs 235 pivotally connected as at 236 to crank arms 237 projecting forwardly from the rock shafts 221 and 222. Fig. 16 shows the crank arms 223 and 224 in a dead center position and it will be evident that movement of the pitmen in either direction from the position shown in Fig. 16 will cause simultaneous rocking of the shafts 221 and 222 in opposite directions and consequent movement of the two sets of saws in opposite directions.

The mechanisms shown in Figs. 16 and 18 to 23 inclusive are claimed more specifically in companion application Serial No. 732,048, filed June 23, 1934.

*Conveying and ejecting mechanism for stock cut by saws 205 (Figs. 16, 18, 20, 21, and 23 to 27 inclusive)*

The pulleys 238 and 239 around which the conveyor belt 211 travels are mounted on shafts 240 journaled in bearing brackets 241 supported in any suitable manner on or above frame bars 215. Pulley 238 may constitute the drive pulley and have a sprocket wheel 242 fixed upon its shaft 240. This sprocket wheel is connected by a sprocket chain 243 with sprocket wheel 244 on a shaft 245 which carries one pulley 246 of an extension conveyer 247.

The extension conveyer (Figs. 24 to 27 inclusive) is spaced a few inches from the end of the conveyer 211, the spacing between these conveyers being such that the short cut bars of ice cream of predetermined length are capable of bridging the space between the conveyers whereas the short stub ends drop through the space between these two conveyers where they may be collected in receptacles for return to the freezer or may be reconveyed thereto through any suitable conveyer mechanism (not shown).

The extension conveyer 247 is substantially similar to the conveyer 211 and it is designed to deliver the sticks of ice cream through an opening 248 in the wall 30 of the hardening room into any suitable hopper (not shown) where said sticks are bundled and passed to the final individual portion cutting machine of Vogt's copending application Serial No. 658,264, filed Feb. 23, 1933.

The upper working run of the extension conveyer travels over the bottom of a U-shaped trough 249 which prevents the ice cream bars from falling laterally from the conveyer. The flanged upper ends of this trough are secured to angle bars 250 supported upon brackets 251, rising from main longitudinally extending frame bars 252 which in turn are supported upon legs or standards 253.

Frame bars 252 support not only the bearings for the shaft 245 but also the bearings 254 for the shaft 255, which carries the pulley 256 at the delivery end of the extension conveyer 247. As best seen in Figs. 24 and 27, shaft 255 carries a sprocket wheel 256' driven by a drive chain 257, from a driving sprocket 258, by a motor 258', which is synchronized as will be later described with the drive of the other conveyer parts of the apparatus.

Both the conveyer 211 and the conveyer 247 are provided with means for tensioning the belts and since such means are identical in each instance, a description of the tensioning means of the extension conveyer will suffice for both. This means includes a pair of levers 259 pivoted at 260 upon the frame bars 252. Journaled between the ends of the levers is a roller 261 resting upon the lower run of the belt 247. This belt is of somewhat excess length, providing a pendant portion engaged by the roller 261 and disposed between supporting rollers 262 journaled on axles 263 connecting the frame bars 252. Yoke arms 264 pendant from the ends of the arms 259 are connected by a cross rod 265 upon which are mounted a series of weights 266. These weights act through the levers 259 and the roller 261 to exert a substantial downward pressure on that portion of the belt lying between the rollers 262 and to tension the belt to any extent desired. It will be understood that the amount of tension exerted may be varied by interchanging, or adding, or removing weights 266 and that when once these weights have been properly adjusted, the tension on the belt will remain uniform regardless of the amount of stretching which may occur therein.

*Coordinated drive*

In Fig. 1 there is shown very diagrammatically a general layout for the apparatus, the details of which are shown in the other figures. From this view it will be seen that the bar 32 of ice cream is delivered from the left at the upper side of the figure, is advanced by the case hardening conveyer, and cut into long sections which drop onto the deep hardening conveyer. The bars then moved toward the lower side of the figure in the direction indicated by the arrows and are then cut into the shorter sections and delivered toward the left from the hardening room.

The different drive mechanisms may be coordinated and operated in timed relationship. Merely as an indication of such a drive and timing mechanism, there is shown diagrammatically an electric motor 270 which drives a variable speed gearing 271 which may be of the Reeves or other similar type. The driving ratio of this variable speed gearing may be controlled from a distance, if desired, through control mechanism 272. Power is transmitted from the driven shaft of the gearing through gears, sprocket and chain or the like to a reducing gearing 273 which drives the shaft 68 previously referred to, and a shaft 274 which may have a sprocket and chain drive to a further reducing gearing 275. The latter may serve to drive the shaft 186 (also shown in Fig. 16) and power may be transmitted from this shaft to the shaft 203 of the mechanism employed for feeding the bars past the cutters 205. The conveyer 247 may be independently driven as for instance by means of a separate motor 276.

*Operation*

While the operation of the apparatus will be apparent from the foregoing description thereof, it may be briefly recapitulated as follows:

Ice cream in a plastic condition and enclosed in the two part paper wrapper 51 is fed continuously through the opening 30 in the hardening chamber wall. The projecting tabs of the paper wrappers are grasped by the case hardening conveyer and this conveyer being timed to travel at a speed corresponding with the feed of the ice cream into the hardening chamber, moves the rod through duct 77—78 into which cold air is being continuously blown from the flue 82.

The studs 52 arranged at intervals on the length of the case hardening conveyer, are operable to engage the corresponding studs 103 on the bar drop carriage and move this carriage forwardly until such time as the two sets of studs are disengaged by the action of the cam 109 on the roller 105. During the movement of the bar drop carriage under the driving impetus of the case hardening conveyer, the lever 150 will be rocked to the left as shown in Fig. 10 under the influence of the cam 154, thereby depressing the saw S and severing a long case hardened bar from the ice cream rod. Before this bar reaches the saw, the paper tabs 50 which are gripped by the case hardening conveyer during its handling of the bar, have been folded inwardly against the bar by the folding mechanism illustrated in Fig. 15 and are held in inwardly folded position by the collar 161 arranged just in advance of the point of cutting.

After the cutting operation has been completed and while the bar drop carriage is still being driven forward by the case hardening conveyer, the actuating levers 124 for the bar drop plates 99 will have contacted with the screws 129 thereby displacing plates 99 against the action of spring 125 and permitting the long case hardened bar to drop onto a flight F of the deep hardening conveyer D.

If the counterweight 147 by any chance fails to reelevate the saw S after the cutting operation, engagement of emergency roller 158 with the stop member 159 will effect such reelevation while the bar drop member is still moving under the influence of the case hardening conveyer.

After the bar has been cut and dropped onto the deep hardening conveyer, the roller 105 travels up the cam 109 to effect disengagement of the studs 52 and 103 whereupon the counterweight 111 restores the bar drop carriage to its normal position, travel of the carriage in this direction being retarded by the dash pot structure 119, 121.

The long case hardened bar is now carried by the deep hardening conveyer at a very slow rate of speed through the intensely cold air duct 191 (Fig. 17). As the bars frozen all the way through reach the end of the deep hardening conveyer, they roll down the ramp 201 and are picked up by the transfer wheels 204. These transfer wheels carry the bars to and past the saws 205 which sever them into a plurality of accurately predetermined shorter lengths, these lengths dropping onto the conveyer 211 and being transferred to the extension conveyer 247.

The short scrap ends of the bars drop through the space between the adjacent ends of the conveyers 211 and 247 from which point they are conveyed away either continuously or intermittently for unwrapping and reprocessing. The accurately cut bar sections are delivered by the extension conveyer 247 through the opening 248 in the hardening room wall where they are ready for further processing such for instance as further subdivision into individual service portions of ice cream.

Having thus described our invention, what we claim as new and desire to secure by Letters Patent is:

1. An apparatus for producing frozen comestibles, including a conveyer for continuously advancing endwise a wrapped bar of partially solidified edible material, means for refrigerating the bar while it is in the conveyer, a bar cutter arranged beyond the conveyer, means operable after a predetermined length of the case hardened bar has been advanced beyond the cutter for operating the cutter to sever it into measured lengths, a support for the portion of the bar beyond the cutter, and means for dropping from said support the portion of the bar thus severed.

2. An apparatus for producing packages of frozen comestibles, including a conveyer for continuously delivering a wrapped bar of partially solidified edible material, means to effect case hardening of the bar while it is in the conveyer, a bar cutter arranged beyond the conveyer, means operable after a predetermined length of the case hardened bar has been advanced beyond the cutter for operating the cutter to sever said bar into measured lengths, and means for effecting a translational movement of the cutter in the same direction as the feed of the bar and at the same speed as the bar during cutting operations.

3. An apparatus for producing packages of frozen comestibles, including a conveyer for continuously delivering a wrapped bar of partially solidified edible material, means for refrigerating the bar while it is in the conveyer, a traveling cut-off operable after a predetermined length of the bar has been advanced, to sever it into measured lengths, a second conveyer onto which the cut-off sections are deposited, for moving said sections in a direction at right angles to the first mentioned conveyer, and means for refrigerating the bar sections on said second conveyer.

4. An apparatus for producing packages of frozen comestibles, including a conveyer for continuously advancing endwise a wrapped bar of partially solidified edible material, said conveyer having means for gripping tabs along opposite sides of said bar, means to refrigerate the bar while it is in the conveyer, and a traveling cut-off for cutting the bar into sections during the advancing movement.

5. An apparatus for producing packages of frozen comestibles, including a conveyer for continuously advancing endwise a wrapped bar of partially solidified edible material having laterally projecting tabs on opposite sides, said conveyer acting to grip said tabs, means to refrigerate the bar while it is in the conveyer, a bar cutter arranged beyond the conveyer, and means for folding said tabs inwardly against the surface of the wrapper after the bar has left the conveyer and before it reaches the cutter.

6. Apparatus of the character described including a conveyer which continuously delivers a bar of wrapped edible material in a plastic condition, cutter mechanism operable after a predetermined length of the bar has been advanced therebeyond to sever it into sections of predetermined lengths, a second conveyer receiving the severed sections of the bar, and means for refrigerating said sections to effect hardening thereof as they are advanced by the second conveyer.

7. Apparatus of the character described including a conveyer which continuously delivers a bar of wrapped edible material in a plastic condition, cutter mechanism operable after a predetermined length of the bar has been advanced therebeyond to sever such predetermined length, a second conveyer receiving the severed lengths, and means for refrigerating said lengths to effect hardening thereof as they are advanced by the second conveyer, said last mentioned conveyer traveling in a path at right angles to the path of travel of the first mentioned conveyer.

8. Apparatus of the character described including a conveyer which continuously delivers a bar of wrapped edible material in a plastic condition, cutter mechanism operable after a predetermined length of the bar has been advanced therebeyond to sever the bar into sections of predetermined length, a second conveyer receiving the severed sections, and means to effect hardening of the bar sections as they are advanced by the second conveyer, said second conveyer traveling at much lower speed than the first conveyer and in a direction at right angles to the direction of travel of the latter.

9. Apparatus of the character described including a conveyer which continuously delivers a bar in a plastic condition, cutter mechanism operable after a predetermined length of the bar has been advanced therebeyond to sever it into sections of predetermined length, a second conveyer receiving the severed sections, and traveling in a path at right angles to the path of travel of the first conveyer, said second conveyer including a series of closely juxtaposed bar receiving flights, and traveling at much lower speed than the case hardening conveyer, to present a new flight for the reception of each severed section, and means for chilling said flights to harden said sections.

10. Apparatus of the character described including a conveyer which continuously delivers a bar in a plastic condition, cutter mechanism operable to sever the bar into sections of predetermined length as it is delivered by said conveyer, a second conveyer receiving the severed sections, means to refrigerate the sections as they are advanced by the second conveyer, and means at the delivery end of the second conveyer for subdividing the sections into a plurality of shorter sections of predetermined length.

11. Apparatus of the character described including a conveyer which continuously delivers a bar of plastic condition, cutter mechanism operable to sever the bar into sections of predetermined length as it is delivered by said conveyer, a second conveyer receiving the severed sections, means to refrigerate the sections to harden them as they are advanced by the second conveyer, means at the delivery end of the second conveyer for subdividing the hardened sections into a plurality of sections of predetermined length, and a conveyer mechanism for receiving such subdivided sections and shifting them axially out of the path of the next bar to be subdivided.

12. Apparatus of the character described including a conveyer for a continuously delivered bar of a plastic material, a traveling cut-off at the end of said conveyer for severing said bar into sections, a second conveyer receiving the severed sections, means for refrigerating said sections on said second conveyer, means at the delivery end of said second conveyer for subdividing said sections into a plurality of shorter sections, and a conveyer mechanism receiving such shorter sections and shifting them axially out of the path of the first mentioned sections to be subdivided, said last mentioned conveyer mechanism including a pair of coacting conveyers arranged in end-to-end relationship and having their ends spaced apart a distance less than the length of one of the shorter sections to permit gravitational rejection of the stud ends resulting from the last mentioned subdividing operation.

13. In combination, means for continuously feeding endwise a plastic bar of partially frozen edible substance, a conveyer traveling at right angles to the direction of travel of said bar, means for subdividing said bar into sections and delivering said sections onto said conveyer, a refrigerating chamber, a second conveyer in said chamber and traveling in a direction parallel to the direction of travel of said bar, and means at the delivery end of said first mentioned conveyer for subdividing said sections into shorter sections of accurately predetermined length and depositing said shorter sections upon said second mentioned conveyer.

14. In combination, a conveyer, means for continuously feeding into such conveyer a plastic stream of partially frozen edible substance encased in a wrapper, a second refrigerated conveyer traveling at right angles to the direction of travel of the first mentioned conveyer, a cutter for severing long lengths of the material after said material has been advanced beyond the first mentioned conveyer, support means for receiving said material after it leaves said first mentioned conveyer, means for displacing said support means to drop the severed bars onto the second mentioned conveyer, and means at the delivery end of the second conveyer for subdividing such lengths of material into smaller pieces of accurately determined length and effecting deposit of such pieces upon a third conveyer.

15. In combination, a conveyer, means for continuously feeding into such conveyer a plastic stream of partially frozen edible substance encased in a wrapper, a refrigerated conveyer traveling at right angles to the direction of travel of the first mentioned conveyer, a third conveyer traveling in a direction parallel to the direction of the travel of the case hardening conveyer, means for severing relatively long measured lengths of the material after it leaves the first mentioned conveyer and effecting deposit of such lengths on the refrigerated conveyer, and means at the delivery end of the refrigerated conveyer for subdividing such lengths of stock into smaller pieces of accurately predetermined length and effecting deposit of such pieces upon said third conveyer, said first mentioned conveyer traveling at a speed corresponding to the speed of feed of the plastic stream thereto, said refrigerated conveyer traveling at a much lower speed than the first mentioned conveyer, said third conveyer traveling at a speed greater than the speed of the first mentioned conveyer.

16. In combination, a conveyer, means for continuously feeding into such conveyer a plastic stream of partially frozen edible substance encased in a wrapper, a second conveyer traveling at right angles to the direction of travel of the first conveyer, means for severing relatively long measured lengths of material after it leaves the first conveyer and effecting deposit of such lengths on the second conveyer, means at the delivery end of the second conveyer for subdividing such lengths of stock into smaller pieces of accurately predetermined length, the first conveyer and the second conveyer both including the highly conductive metal support elements in contact with the material to be hardened, and ducts around said conveyers for directing cold air against said conductive elements.

17. Apparatus for subdividing a wrapped, partially frozen rod of edible material, a conveyer for continuously advancing said rod, a refrigerating chamber, a carriage member in said chamber and including a support portion onto which the material is fed by the conveyer, cut-off mechanism mounted on the carriage, means associated with the conveyer for intermittently causing the carriage to travel in the same direction and at the same speed as the material, means for operating the cut-off mechanism during such travel of the carriage, and means to effect return of the carriage.

18. Apparatus for subdividing a wrapped, partially frozen rod of edible material, a conveyer for continuously advancing said rod, means for refrigerating said rod, a support portion onto which the material is fed by the conveyer, a carriage member, cut-off mechanism mounted on the carriage, means associated with the conveyer for intermittently causing the carriage to travel in the same direction and at the same speed as the material, means for operating the cut-off mechanism during such travel of the carriage, the support portion being displaceable for effecting an ejection of the bar of material, and means for intermittently displacing said support mechanism after actuation of the cutter mechanism.

19. Apparatus for subdividing a wrapped, partially frozen rod of edible material, a conveyer for continuously advancing said rod, a refrigerating chamber, a support onto which the material is fed by the conveyer, a carriage member in said chamber, cut-off mechanism mounted on the carriage, means associated with the conveyer for intermittently causing the carriage to travel in the same direction and at the same speed as the material, means for operating the cut-off mechanism during such travel of the carriage, said support being displaceable for effecting ejection of the bar of material, means for intermittently displacing said support mechanism after actuation of the cutter mechanism, and means for automatically disengaging the carriage from the conveyer and replacing the support mechanism to permit return movement of the carriage.

20. The combination with an endless conveyer, including a plurality of parallel trough-like flights, a support onto which a rod of comestible material is delivered, arranged above one end of the conveyer, means for cutting said rod into predetermined lengths, means for displacing said support to drop said rods onto the flights of the conveyer, and means for blowing refrigerated air lengthwise of said flights to harden said lengths.

21. A conveyer structure including a pair of upper and lower endless sections, and tracks upon which the sections travel, each conveyer section including an articulated series of trough shaped blocks of highly heat conductive material, means for maintaining said blocks at a low temperature, said conveyers being so articulated that on the working runs thereof the blocks of each run present a substantially continuous trough section, the troughs of the two sections complementing each other to define a substantially closed passage into which a wrapped, partially frozen plastic mass of edible material is adapted to be delivered at a rate corresponding to the speed of travel of the conveyers.

22. A conveyer structure including a pair of upper and lower endless sections, tracks upon which the sections travel, each conveyer including an articulated series of trough shaped blocks of highly heat conductive material, said conveyers being so articulated that on the working runs thereof the blocks of each run present a substantially continuous trough section, the troughs of the two sections complementing each other to define a substantially closed passage into which a wrapped, partially frozen plastic mass of edible material is adapted to be delivered at a rate corresponding to the speed of travel of the conveyers, said trough forming blocks including heat radiating fins, and means for air cooling the fins.

23. A conveyer structure including a pair of upper and lower endless sections, tracks upon which the sections travel, each conveyer section including an articulated series of trough shaped blocks of highly heat conductive material, means for maintaining said blocks at a low temperature, said conveyers being so articulated that on the working runs thereof the blocks of each run present a substantially continuous trough section, the troughs of the conveyer sections defining a substantially closed chamber into which a wrapped, partially frozen plastic mass of edible material is adapted to be delivered at a rate corresponding to the speed of travel of the conveyers, and mating means beyond the trough forming portions of the blocks, adapted to engage and clamp a tab projecting from the material wrapper.

24. A conveyer structure including a pair of upper and lower endless sections, tracks upon which the sections travel, each conveyer including an articulated series of trough shaped blocks of highly heat conductive material, said conveyers being so articulated that on the working runs thereof the blocks of each run present a substantially continuous trough section, the troughs of the conveyer sections defining a substantially closed chamber into which a wrapped, partially frozen plastic mass of edible material is adapted to be delivered at a rate corresponding to the speed of travel of the conveyers, mating means beyond the trough forming portions of the blocks, adapted to engage and clamp a tab projecting from the material wrapper, a duct through which the working runs of the conveyer section are movable, and means for supplying a gaseous cooling medium to the duct.

25. The combination with a refrigerated chamber, a conveyer adapted to deliver a continuous length of a rod of comestible into said chamber, of a reciprocating carriage within said chamber having one end arranged adjacent the delivery end of the conveyer, a support for the rod delivered from the conveyer, means on the carriage for severing the rod, means on the carriage for displacing the support to drop the severed sections, the conveyer including means arranged at intermittent intervals to engage and actuate the carriage, means associated with the carriage for releasing the carriage from driving engagement with the conveyer after the former has moved a predetermined distance and the rod has been cut and dropped, and means for returning the carriage.

26. The combination with a refrigerated chamber, a conveyer adapted to deliver a continuous length of a rod of comestible into said chamber, of a reciprocating carriage within said chamber having one end arranged adjacent the delivery end of the conveyer, a support for the rod delivered from the conveyer, means on the carriage for severing the rod, means on the carriage for displacing the support to drop the severed sections, the conveyer including means arranged at intermittent intervals to engage and actuate the carriage, means associated with the carriage for releasing the carriage from driving engagement with the conveyer after the former has moved a predetermined distance and the rod has been cut and dropped, and means for returning the carriage, the driving means for the carriage including studs arranged at intervals on the conveyer and corresponding studs on the carriage to be engaged thereby.

27. The combination with a refrigerated chamber, a conveyer adapted to deliver a continuous length of a rod of comestible into said chamber, of a reciprocating carriage within said chamber having one end arranged adjacent the delivery end of the conveyer, a support for the rod delivered from the conveyer, means on the carriage for severing the rod into sections, means on the carriage for displacing the support to drop the severed sections, the conveyer including means arranged at spaced points to engage and actuate the carriage, means associated with the carriage for releasing the carriage from driving engagement with the conveyer after the former has moved a predetermined distance and the rod has been cut and dropped, and means for returning the carriage, the driving means for the carriage including studs arranged at intervals on the conveyer and corresponding studs on the carriage to be engaged thereby, the release means including a cam to effect displacement of the carriage studs with respect to the conveyer studs after a predetermined movement of the carriage.

28. A refrigerating chamber, means for delivering into said chamber a bar of a comestible to be hardened, a cutter for severing successive sections from said bar, a bar supporting and ejecting mechanism including a pair of support plates, and means beyond said cutter to normally hold said plates with their edges in abutment, said plates cooperatively defining a channel to support and guide a bar as it is advanced along the channel, and intermittent operating means for effecting relative separation of the plates to permit gravitational ejection of the bar.

29. A conveyer including a pair of spaced parallel endless runs, a plurality of trough-like highly heat conductive cross members having their ends connected to said members, cooling fins on the trough-like members, an air duct enclosing the working run of the conveyer, and means for supplying and distributing a gaseous cooling medium into and through the duct.

30. A method of converting a continuously extruded and continuously wrapped plastic bar of edible material of uniform cross-section, into solidly frozen sticks of relatively short length, said method including the steps of advancing the plastic mass in a straight line while case hardening the latter, cutting off relatively long case hardened bars from the end of said continuously advancing mass, completing the hardening of said case hardened bars while conveying them slowly and transversely to the direction of straight line travel of the mass, and then subdividing said completely hardened bars into short sticks of predetermined length.

31. A method of continuously processing a continuously extruded and wrapped plastic bar of ice cream, which consists in case hardening the bar, intermittently severing the continuously advancing case hardened bar into long lengths, deep hardening such long lengths, and subdividing the latter into short solidly frozen sticks.

32. An apparatus for freezing a comestible, including a conveyer for continuously advancing endwise a wrapped bar of partially solidified edible material having tabs along the sides thereof, said conveyor having means for gripping said tabs, a traveling cut-off for cutting the bar into sections during the advancing movement, a conveyer for receiving the sections and moving them in a direction at right angles to the movement of the first mentioned conveyer, and means for refrigerating the sections while on said last mentioned conveyer.

33. An apparatus for freezing a comestible, including a conveyer for continuously advancing endwise a wrapped bar of partially solidified edible material having tabs along the sides thereof, said conveyer having means for gripping said tabs, a traveling cut-off for cutting the bar into sections during the advancing movement, a conveyer for receiving the sections and moving them in a direction at right angles to the movement of the first mentioned conveyer, said last mentioned conveyer comprising a series of channel shaped troughs each having radiating fins extending lengthwise thereof, and means for refrigerating said last mentioned conveyer to harden said sections.

34. An apparatus for freezing a comestible, including a conveyer for continuously advancing endwise a wrapped bar of partially solidified edible material having tabs along the sides thereof, said conveyer having means for gripping said tabs, a traveling cut-off for cutting the bar into sections during the advancing movement, a conveyer for receiving the sections and moving them in a direction at right angles to the movement of the first mentioned conveyer, said last mentioned conveyer comprising a series of channel shaped troughs each having radiating fins extending lengthwise thereof, and means for blowing cold air lengthwise of said troughs to harden said sections.

35. An apparatus for hardening bar sections of a comestible, including a hardening chamber, a conveyer movable through said chamber and including a plurality of parallel channel shaped troughs for supporting the bar sections and each having heat radiating fins on the under side thereof, and means for blowing refrigerated air through said chamber lengthwise of said troughs and at right angles to the direction of movement of the conveyer.

36. An apparatus for hardening bar sections of a comestible, including a hardening chamber, a conveyer movable through said chamber and including a plurality of parallel channel shaped troughs for supporting the bar sections and each having heat radiating fins on the under side thereof, and means for blowing refrigerated air through said chamber lengthwise of said troughs and both above and below the latter.

37. An apparatus for hardening bar sections of a comestible, including a hardening chamber, a conveyer movable through said chamber and including a plurality of parallel channel shaped troughs for supporting the bar sections and each having heat radiating fins on the under side thereof, means for blowing refrigerated air through said chamber lengthwise of said troughs and both above and below the latter, and means for protecting the ends of the bar sections from the direct action of the air blast.

38. An apparatus for refrigerating a comestible, including means for delivering a bar of comestible endwise, a traveling cut-off for subdividing the bar into sections, a pair of members beyond said cut-off and adapted to support the end portion of the bar during the cutting action, means for spreading said members apart to drop said end portion after the severing action, and means for refrigerating the cut-off sections to harden them.

39. An apparatus for refrigerating a comestible, including means for delivering a bar of comestible endwise, a traveling cut-off for subdividing the bar into sections, a pair of members beyond said cut-off and adapted to support the end portion of the bar during cutting action, means for spreading said members apart and advancing them in the direction of movement of the bar but at a faster rate to move the cut off sections away from the traveling cut-off and to drop them out of the path of the advancing bar, and means for refrigerating the cut-off sections.

CLARENCE W. VOGT.
PAUL PHELPS.